US009177447B2

(12) United States Patent
Zoltewicz et al.

(10) Patent No.: US 9,177,447 B2
(45) Date of Patent: Nov. 3, 2015

(54) GAMING SYSTEM AND METHOD FOR PROVIDING A SYMBOL MATRIX WITH A MOVEABLE SYMBOL DISPLAY WINDOW

(71) Applicant: IGT, Reno, NV (US)

(72) Inventors: Benjamin J. Zoltewicz, Mill Valley, CA (US); Mark C. Nicely, Daly City, CA (US); Ernest M. Lafky, San Francisco, CA (US)

(73) Assignee: IGT, Las Vegas, NV (US)

( * ) Notice: Subject to any disclaimer, the term of this patent is extended or adjusted under 35 U.S.C. 154(b) by 174 days.

(21) Appl. No.: 13/626,344

(22) Filed: Sep. 25, 2012

(65) Prior Publication Data

US 2014/0087821 A1 Mar. 27, 2014

(51) Int. Cl.

| | |
|---|---|
| ***G06F 17/00*** | (2006.01) |
| ***G07F 17/32*** | (2006.01) |
| ***G07F 17/34*** | (2006.01) |

(52) U.S. Cl.

CPC .............. *G07F 17/34* (2013.01); *G07F 17/326* (2013.01)

(58) Field of Classification Search

CPC ...................................................... G06F 17/326
USPC ................................................. 463/16, 17, 18
See application file for complete search history.

(56) References Cited

U.S. PATENT DOCUMENTS

| | | | |
|---|---|---|---|
| 3,167,313 | A | 1/1965 | Davenport et al. |
| 4,003,578 | A | 1/1977 | Jones |
| 4,103,895 | A | 8/1978 | Pressman et al. |
| 4,182,515 | A | 1/1980 | Nemeth |
| 4,198,052 | A | 4/1980 | Gauselmann |
| 4,251,078 | A | 2/1981 | Meirovitz |
| 4,277,067 | A | 7/1981 | Gettleman |
| D261,782 | S | 11/1981 | Muir |
| 4,323,242 | A | 4/1982 | Rosenfeld |
| 4,448,419 | A | 5/1984 | Telnaes |
| 4,511,143 | A | 4/1985 | Sankrithi |
| 4,548,410 | A | 10/1985 | Morrone |
| 4,618,150 | A | 10/1986 | Kimura |
| 4,624,459 | A | 11/1986 | Kaufman |
| 4,695,053 | A | 9/1987 | Vazquez et al. |
| 4,732,386 | A | 3/1988 | Rayfiel |
| 4,756,531 | A | 7/1988 | DiRe et al. |
| 4,820,908 | A | 4/1989 | Wei |
| 4,826,169 | A | 5/1989 | Bessho et al. |
| 4,838,552 | A | 6/1989 | Hagiwara |
| 4,850,592 | A | 7/1989 | Winter |
| 4,874,173 | A | 10/1989 | Kishishita |
| 4,991,848 | A | 2/1991 | Greenwood et al. |
| 5,019,973 | A | 5/1991 | Wilcox et al. |
| 5,080,368 | A | 1/1992 | Weisser |
| 5,083,800 | A | 1/1992 | Lockton |

(Continued)

FOREIGN PATENT DOCUMENTS

| | | |
|---|---|---|
| EP | 0 060 019 | 9/1982 |
| EP | 0 238 289 | 9/1987 |

(Continued)

*Primary Examiner* — Reginald Renwick
(74) *Attorney, Agent, or Firm* — Neal, Gerber & Eisenberg LLP

(57) ABSTRACT

In various embodiments, the present disclosure generally relates to gaming systems and methods which utilize a symbol matrix or symbol field in conjunction with a movable symbol display window to randomly select different subsets of symbols from the symbol matrix and provide different awards to players based on such selected symbol subsets.

22 Claims, 13 Drawing Sheets

(56) References Cited

U.S. PATENT DOCUMENTS

| | | | |
|---|---|---|---|
| 5,085,436 | A | 2/1992 | Bennett |
| 5,102,134 | A | 4/1992 | Smyth |
| 5,102,137 | A | 4/1992 | Ekiert |
| 5,178,395 | A | 1/1993 | Lovell |
| 5,178,545 | A | 1/1993 | Thompson |
| 5,209,479 | A | 5/1993 | Nagao et al. |
| 5,308,065 | A | 5/1994 | Bridgeman et al. |
| 5,332,228 | A | 7/1994 | Schultz |
| 5,333,868 | A | 8/1994 | Goldfarb |
| 5,342,047 | A | 8/1994 | Heidel et al. |
| 5,342,049 | A | 8/1994 | Wichinsky et al. |
| 5,344,144 | A | 9/1994 | Cannon |
| 5,355,442 | A | 10/1994 | Paglieroni et al. |
| 5,393,061 | A | 2/1995 | Manship et al. |
| 5,395,111 | A | 3/1995 | Inoue |
| 5,413,342 | A | 5/1995 | Kaplan |
| 5,423,539 | A | 6/1995 | Nagao |
| 5,431,408 | A | 7/1995 | Adams |
| 5,449,173 | A | 9/1995 | Thomas et al. |
| 5,542,669 | A | 8/1996 | Charron et al. |
| 5,566,942 | A | 10/1996 | Elum |
| 5,569,084 | A | 10/1996 | Nicastro et al. |
| 5,580,053 | A | 12/1996 | Crouch |
| 5,580,055 | A | 12/1996 | Hagiwara |
| 5,584,764 | A | 12/1996 | Inoue |
| 5,609,524 | A | 3/1997 | Inoue |
| 5,611,535 | A | 3/1997 | Tiberio |
| 5,611,730 | A | 3/1997 | Weiss |
| 5,664,998 | A | 9/1997 | Seelig et al. |
| 5,697,843 | A | 12/1997 | Manship et al. |
| 5,704,835 | A | 1/1998 | Dietz, II |
| 5,720,662 | A | 2/1998 | Holmes, Jr. et al. |
| 5,722,891 | A | 3/1998 | Inoue |
| 5,725,428 | A | 3/1998 | Achmüller |
| 5,752,881 | A | 5/1998 | Inoue |
| 5,766,074 | A | 6/1998 | Cannon et al. |
| 5,769,716 | A | 6/1998 | Saffari et al. |
| 5,772,509 | A | 6/1998 | Weiss |
| 5,775,692 | A | 7/1998 | Watts et al. |
| 5,779,545 | A | 7/1998 | Berg et al. |
| 5,788,573 | A | 8/1998 | Baerlocher et al. |
| 5,807,172 | A | 9/1998 | Piechowiak |
| 5,810,361 | A | 9/1998 | Kadlic |
| 5,813,672 | A | 9/1998 | Loud, Jr. |
| 5,823,873 | A | 10/1998 | Moody |
| 5,823,874 | A | 10/1998 | Adams |
| 5,833,536 | A | 11/1998 | Davids et al. |
| 5,833,537 | A | 11/1998 | Barrie |
| 5,848,932 | A | 12/1998 | Adams |
| 5,851,148 | A | 12/1998 | Brune et al. |
| 5,855,514 | A | 1/1999 | Kamille |
| 5,882,259 | A | 3/1999 | Holmes, Jr. et al. |
| 5,882,261 | A | 3/1999 | Adams |
| 5,890,962 | A | 4/1999 | Takemoto |
| 5,902,184 | A | 5/1999 | Bennett |
| 5,919,088 | A | 7/1999 | Weiss |
| 5,927,714 | A | 7/1999 | Kaplan |
| 5,931,467 | A | 8/1999 | Kamille |
| 5,947,820 | A | 9/1999 | Morro et al. |
| 5,951,397 | A | 9/1999 | Dickinson |
| 5,957,774 | A | 9/1999 | Holmes, Jr. et al. |
| 5,961,384 | A | 10/1999 | Robinson |
| 5,976,016 | A | 11/1999 | Moody et al. |
| 5,980,384 | A | 11/1999 | Barrie |
| 5,984,781 | A | 11/1999 | Sunaga |
| 5,984,782 | A | 11/1999 | Inoue |
| 5,997,400 | A | 12/1999 | Seelig et al. |
| 5,997,401 | A | 12/1999 | Crawford |
| 6,004,207 | A | 12/1999 | Wilson, Jr. et al. |
| 6,004,208 | A | 12/1999 | Takemoto et al. |
| 6,015,346 | A | 1/2000 | Bennett |
| 6,027,115 | A | 2/2000 | Griswold et al. |
| 6,033,307 | A | 3/2000 | Vancura |
| 6,056,642 | A | 5/2000 | Bennett |
| 6,059,289 | A | 5/2000 | Vancura |
| 6,059,658 | A | 5/2000 | Mangano et al. |
| 6,062,980 | A | 5/2000 | Luciano |
| 6,068,552 | A | 5/2000 | Walker et al. |
| 6,089,976 | A | 7/2000 | Schneider et al. |
| 6,089,977 | A | 7/2000 | Bennett |
| 6,093,102 | A | 7/2000 | Bennett |
| 6,095,921 | A | 8/2000 | Walker et al. |
| 6,102,798 | A | 8/2000 | Bennett |
| 6,113,098 | A | 9/2000 | Adams |
| 6,120,031 | A | 9/2000 | Adams |
| 6,120,377 | A | 9/2000 | McGinnis, Sr. et al. |
| 6,120,378 | A | 9/2000 | Moody |
| 6,123,333 | A | 9/2000 | McGinnis, Sr. et al. |
| 6,126,542 | A | 10/2000 | Fier |
| 6,134,556 | A | 10/2000 | Shin |
| 6,142,873 | A | 11/2000 | Weiss et al. |
| 6,142,874 | A | 11/2000 | Kodachi et al. |
| 6,142,875 | A | 11/2000 | Kodachi et al. |
| 6,146,273 | A | 11/2000 | Olsen |
| 6,155,925 | A | 12/2000 | Giobbi et al. |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,165,070 | A | 12/2000 | Nolte et al. |
| 6,168,520 | B1 | 1/2001 | Baerlocher et al. |
| 6,174,233 | B1 | 1/2001 | Sunaga et al. |
| 6,186,894 | B1 | 2/2001 | Mayeroff |
| 6,190,254 | B1 | 2/2001 | Bennett |
| 6,190,255 | B1 | 2/2001 | Thomas et al. |
| 6,200,217 | B1 | 3/2001 | Osawa |
| 6,203,429 | B1 | 3/2001 | DeMar et al. |
| 6,203,430 | B1 | 3/2001 | Walker et al. |
| 6,220,959 | B1 | 4/2001 | Holmes, Jr. et al. |
| 6,224,483 | B1 | 5/2001 | Mayeroff |
| 6,227,971 | B1 | 5/2001 | Weiss |
| 6,231,442 | B1 | 5/2001 | Mayeroff |
| 6,231,445 | B1 | 5/2001 | Acres |
| 6,234,897 | B1 | 5/2001 | Frohm et al. |
| 6,241,607 | B1 | 6/2001 | Payne et al. |
| 6,251,013 | B1 | 6/2001 | Bennett |
| 6,254,481 | B1 | 7/2001 | Jaffe |
| 6,257,981 | B1 | 7/2001 | Acres et al. |
| 6,261,177 | B1 | 7/2001 | Bennett |
| 6,261,178 | B1 | 7/2001 | Bennett |
| 6,270,409 | B1 | 8/2001 | Shuster |
| 6,270,411 | B1 | 8/2001 | Gura et al. |
| 6,270,412 | B1 | 8/2001 | Crawford et al. |
| 6,273,420 | B1 | 8/2001 | Brooks |
| 6,287,197 | B1 | 9/2001 | Dickinson et al. |
| 6,299,165 | B1 | 10/2001 | Nagano |
| 6,299,170 | B1 | 10/2001 | Yoseloff |
| 6,302,398 | B1 | 10/2001 | Vecchio |
| 6,309,299 | B1 | 10/2001 | Weiss |
| 6,309,300 | B1 | 10/2001 | Glavich |
| 6,311,976 | B1 | 11/2001 | Yoseloff et al. |
| 6,315,660 | B1 | 11/2001 | DeMar et al. |
| 6,315,663 | B1 | 11/2001 | Sakamoto |
| 6,315,664 | B1 | 11/2001 | Baerlocher et al. |
| 6,319,124 | B1 | 11/2001 | Baerlocher et al. |
| 6,322,078 | B1 | 11/2001 | Adams |
| 6,328,649 | B1 | 12/2001 | Randall et al. |
| 6,336,860 | B1 | 1/2002 | Webb |
| 6,340,159 | B1 | 1/2002 | Giangrante |
| 6,346,043 | B1 | 2/2002 | Collin et al. |
| 6,347,996 | B1 | 2/2002 | Gilmore et al. |
| 6,358,144 | B1 | 3/2002 | Kaddlic et al. |
| 6,358,147 | B1 | 3/2002 | Jaffe et al. |
| 6,364,314 | B1 | 4/2002 | Canterbury |
| 6,364,766 | B1 | 4/2002 | Anderson et al. |
| 6,364,767 | B1 | 4/2002 | Brossard et al. |
| 6,375,570 | B1 | 4/2002 | Poole |
| 6,386,973 | B1 | 5/2002 | Yoseloff |
| 6,386,974 | B1 | 5/2002 | Adams |
| 6,386,975 | B1 | 5/2002 | Peterson |
| 6,394,902 | B1 | 5/2002 | Glavich et al. |
| 6,398,218 | B1 | 6/2002 | Vancura |
| 6,398,644 | B1 | 6/2002 | Perrie et al. |
| 6,406,369 | B1 | 6/2002 | Baerlocher et al. |

(56) References Cited

U.S. PATENT DOCUMENTS

| | | | |
|---|---|---|---|
| 6,413,162 | B1 | 7/2002 | Baerlocher et al. |
| 6,419,226 | B2 | 7/2002 | Krise et al. |
| 6,419,579 | B1 | 7/2002 | Bennett |
| 6,425,824 | B1 | 7/2002 | Baerlocher et al. |
| 6,428,412 | B1 | 8/2002 | Anderson et al. |
| 6,439,943 | B1 | 8/2002 | Aoki et al. |
| 6,439,993 | B1 | 8/2002 | O'Halloran |
| 6,439,995 | B1 | 8/2002 | Hughs-Baird et al. |
| 6,443,837 | B1 | 9/2002 | Jaffe et al. |
| 6,450,883 | B1 | 9/2002 | O'Halloran |
| 6,454,266 | B1 | 9/2002 | Breeding et al. |
| 6,461,241 | B1 | 10/2002 | Webb et al. |
| 6,464,581 | B1 | 10/2002 | Yoseloff et al. |
| 6,491,584 | B2 | 12/2002 | Graham et al. |
| 6,494,454 | B2 | 12/2002 | Adams |
| 6,494,785 | B1 | 12/2002 | Gerrard et al. |
| 6,511,375 | B1 | 1/2003 | Kaminkow |
| 6,514,141 | B1 | 2/2003 | Kaminkow et al. |
| 6,517,432 | B1 | 2/2003 | Jaffe |
| 6,544,120 | B2 | 4/2003 | Ainsworth |
| 6,547,242 | B1 | 4/2003 | Sugiyama et al. |
| 6,551,187 | B1 | 4/2003 | Jaffe |
| 6,558,254 | B2 | 5/2003 | Baelocher et al. |
| 6,561,900 | B1 | 5/2003 | Baerlocher et al. |
| 6,572,469 | B2 | 6/2003 | Klitsner et al. |
| 6,572,472 | B1 | 6/2003 | Glavich |
| 6,572,473 | B1 | 6/2003 | Baerlocher |
| 6,579,178 | B1 | 6/2003 | Walker et al. |
| 6,582,307 | B2 | 6/2003 | Webb |
| 6,589,117 | B1 | 7/2003 | Moritome et al. |
| 6,595,854 | B2 | 7/2003 | Hughs-Baird et al. |
| 6,599,185 | B1 | 7/2003 | Kaminkow et al. |
| 6,602,136 | B1 | 8/2003 | Baerlocher et al. |
| 6,602,137 | B2 | 8/2003 | Kaminkow et al. |
| 6,604,740 | B1 | 8/2003 | Singer et al. |
| 6,604,999 | B2 | 8/2003 | Ainsworth |
| 6,605,002 | B2 | 8/2003 | Baerlocher |
| 6,607,438 | B2 | 8/2003 | Baerlocher et al. |
| 6,609,971 | B2 | 8/2003 | Vancura |
| 6,612,574 | B1 | 9/2003 | Cole et al. |
| 6,612,575 | B1 | 9/2003 | Cole et al. |
| 6,616,142 | B2 | 9/2003 | Adams |
| 6,632,139 | B1 | 10/2003 | Baerlocher |
| 6,632,141 | B2 | 10/2003 | Webb et al. |
| 6,634,945 | B2 | 10/2003 | Glavich et al. |
| 6,638,164 | B2 | 10/2003 | Randall et al. |
| 6,641,137 | B2 | 11/2003 | Sines et al. |
| 6,644,664 | B2 | 11/2003 | Muir et al. |
| 6,645,071 | B2 | 11/2003 | Perrie et al. |
| 6,645,073 | B2 | 11/2003 | Lemay et al. |
| 6,645,074 | B2 | 11/2003 | Thomas et al. |
| 6,656,040 | B1 | 12/2003 | Brosnan et al. |
| 6,666,766 | B2 | 12/2003 | Baerlocher et al. |
| 6,676,511 | B2 | 1/2004 | Payne et al. |
| 6,676,512 | B2 | 1/2004 | Fong et al. |
| 6,676,516 | B2 | 1/2004 | Baerlocher et al. |
| 6,692,356 | B2 | 2/2004 | Baerlocher et al. |
| 6,695,696 | B1 | 2/2004 | Kaminkow |
| 6,722,981 | B2 | 4/2004 | Kaminkow et al. |
| 6,722,982 | B2 | 4/2004 | Kaminkow et al. |
| 6,733,386 | B2 | 5/2004 | Cuddy et al. |
| 6,743,096 | B2 | 6/2004 | Allendorf et al. |
| 6,749,504 | B2 | 6/2004 | Hughs-Baird |
| 6,752,312 | B1 | 6/2004 | Chamberlain et al. |
| 6,758,747 | B2 | 7/2004 | Baerlocher |
| 6,761,632 | B2 | 7/2004 | Bansemer et al. |
| 6,769,983 | B2 | 8/2004 | Slomiany |
| 6,780,107 | B2 | 8/2004 | Baerlocher et al. |
| 6,780,110 | B2 | 8/2004 | Baerlocher et al. |
| 6,780,111 | B2 | 8/2004 | Cannon et al. |
| 6,783,455 | B2 | 8/2004 | Glavich |
| 6,783,457 | B2 | 8/2004 | Hughs-Baird et al. |
| 6,786,818 | B1 | 9/2004 | Rothschild et al. |
| 6,786,820 | B2 | 9/2004 | Gerrard et al. |
| 6,790,141 | B2 | 9/2004 | Muir |
| 6,793,578 | B2 | 9/2004 | Luccesi et al. |
| 6,808,454 | B2 | 10/2004 | Gerrard et al. |
| 6,814,664 | B2 | 11/2004 | Baerlocher et al. |
| 6,817,944 | B2 | 11/2004 | Kaminkow et al. |
| 6,832,957 | B2 | 12/2004 | Falconer |
| 6,837,793 | B2 | 1/2005 | McClintic |
| 6,840,856 | B2 | 1/2005 | Stern |
| 6,843,722 | B2 | 1/2005 | Webb |
| 6,852,027 | B2 | 2/2005 | Kaminkow et al. |
| 6,863,606 | B1 | 3/2005 | Berg et al. |
| 6,864,357 | B2 | 3/2005 | Eggen et al. |
| 6,866,585 | B2 | 3/2005 | Muir |
| 6,869,357 | B2 | 3/2005 | Adams et al. |
| 6,875,107 | B1 | 4/2005 | Luciano et al. |
| 6,875,108 | B1 | 4/2005 | Hughs-Baird et al. |
| 6,896,615 | B2 | 5/2005 | Berman |
| 6,896,617 | B2 | 5/2005 | Daly |
| 6,899,620 | B2 | 5/2005 | Kaminkow et al. |
| 6,902,478 | B2 | 6/2005 | McClintic |
| 6,905,405 | B2 | 6/2005 | McClintic |
| 6,905,406 | B2 | 6/2005 | Kaminkow et al. |
| 6,908,383 | B2 | 6/2005 | Baerlocher et al. |
| 6,913,533 | B2 | 7/2005 | Cuddy et al. |
| 6,918,830 | B2 | 7/2005 | Baerlocher |
| 6,932,701 | B2 | 8/2005 | Glavich et al. |
| 6,939,226 | B1 | 9/2005 | Joshi |
| 6,958,013 | B2 | 10/2005 | Miereau et al. |
| 6,960,133 | B1 | 11/2005 | Marks et al. |
| 6,966,833 | B2 | 11/2005 | Kaminkow et al. |
| 6,966,835 | B2 | 11/2005 | Graham |
| 6,971,953 | B2 | 12/2005 | Gerrard et al. |
| 6,971,954 | B2 | 12/2005 | Randall et al. |
| 6,974,385 | B2 | 12/2005 | Joshi et al. |
| 6,988,947 | B2 | 1/2006 | Baerlocher et al. |
| 6,988,948 | B2 | 1/2006 | Perrie et al. |
| 6,995,751 | B2 | 2/2006 | Falvo |
| 6,996,833 | B1 | 2/2006 | Olson et al. |
| 7,001,274 | B2 | 2/2006 | Baerlocher et al. |
| 7,014,560 | B2 | 3/2006 | Glavich et al. |
| 7,029,395 | B1 | 4/2006 | Baerlocher |
| 7,037,191 | B2 | 5/2006 | Rodgers et al. |
| 7,040,984 | B2 | 5/2006 | Mead |
| 7,052,392 | B2 | 5/2006 | Tessmer et al. |
| 7,052,395 | B2 | 5/2006 | Glavich et al. |
| 7,056,213 | B2 | 6/2006 | Ching et al. |
| 7,056,214 | B2 | 6/2006 | Miereau et al. |
| 7,070,502 | B1 | 7/2006 | Bussick et al. |
| 7,077,744 | B2 | 7/2006 | Cannon |
| 7,104,888 | B2 | 9/2006 | Miereau et al. |
| 7,112,137 | B2 | 9/2006 | Baerlocher et al. |
| 7,121,942 | B2 | 10/2006 | Baerlocher |
| 7,128,647 | B2 | 10/2006 | Muir |
| 7,156,736 | B2 | 1/2007 | Adams et al. |
| 7,160,186 | B2 | 1/2007 | Cuddy et al. |
| 7,160,188 | B2 | 1/2007 | Kaminkow et al. |
| 7,161,589 | B2 | 1/2007 | Muir |
| 7,168,704 | B1 | 1/2007 | Lawless |
| 7,169,042 | B2 | 1/2007 | Muir et al. |
| 7,169,044 | B2 | 1/2007 | Baerlocher et al. |
| 7,172,506 | B2 | 2/2007 | Baerlocher et al. |
| 7,175,523 | B2 | 2/2007 | Gilmore et al. |
| 7,179,166 | B1 | 2/2007 | Abbott |
| 7,182,689 | B2 | 2/2007 | Hughs-Baird et al. |
| 7,192,345 | B2 | 3/2007 | Muir et al. |
| 7,198,570 | B2 | 4/2007 | Rodgers et al. |
| 7,201,657 | B2 | 4/2007 | Baerlocher et al. |
| 7,235,011 | B2 | 6/2007 | Randall et al. |
| 7,264,545 | B2 | 9/2007 | Maya et al. |
| 7,294,058 | B1 | 11/2007 | Slomiany et al. |
| 7,300,348 | B2 | 11/2007 | Kaminkow et al. |
| 7,303,469 | B2 | 12/2007 | Kaminkow et al. |
| 7,311,598 | B2 | 12/2007 | Kaminkow et al. |
| 7,311,604 | B2 | 12/2007 | Kaminkow et al. |
| 7,314,408 | B2 | 1/2008 | Cannon |
| 7,314,409 | B2 | 1/2008 | Maya et al. |
| 7,318,773 | B2 | 1/2008 | Baerlocher |
| 7,326,115 | B2 | 2/2008 | Baerlocher |
| 7,329,184 | B2 | 2/2008 | Yoshioka |
| 7,335,102 | B2 | 2/2008 | Baerlocher et al. |

(56) References Cited

U.S. PATENT DOCUMENTS

| | | | |
|---|---|---|---|
| 7,338,367 | B2 | 3/2008 | Kaminkow et al. |
| 7,338,369 | B2 | 3/2008 | Mierau et al. |
| 7,351,140 | B2 | 4/2008 | Wolf et al. |
| 7,357,714 | B2 | 4/2008 | Tessmer et al. |
| 7,361,087 | B2 | 4/2008 | Baerlocher et al. |
| 7,393,280 | B2 | 7/2008 | Cannon |
| 7,427,235 | B2 | 9/2008 | Anderson et al. |
| 7,485,038 | B2 | 2/2009 | Rothkranz et al. |
| 7,601,062 | B2 | 10/2009 | Cole et al. |
| 7,927,204 | B2 | 4/2011 | DeBrabander, Jr. et al. |
| 8,287,364 | B2 | 10/2012 | Caputo et al. |
| 8,608,544 | B2 * | 12/2013 | Aoki et al. ...................... 463/20 |
| 2001/0041610 | A1 | 11/2001 | Luciano et al. |
| 2001/0054794 | A1 | 12/2001 | Cole et al. |
| 2002/0014740 | A1 | 2/2002 | Ainsworth |
| 2002/0025844 | A1 | 2/2002 | Casey et al. |
| 2002/0052232 | A1 | 5/2002 | Kaminkow |
| 2002/0055382 | A1 | 5/2002 | Meyer |
| 2002/0065124 | A1 | 5/2002 | Ainsworth |
| 2002/0090990 | A1 | 7/2002 | Joshi et al. |
| 2002/0094857 | A1 | 7/2002 | Meyer |
| 2002/0094862 | A1 | 7/2002 | Inoue |
| 2003/0013514 | A1 | 1/2003 | Cregan et al. |
| 2003/0013518 | A1 | 1/2003 | Graham |
| 2003/0017868 | A1 | 1/2003 | Crawford |
| 2003/0036422 | A1 | 2/2003 | Baerlocher et al. |
| 2003/0036424 | A1 | 2/2003 | Baerlocher |
| 2003/0040358 | A1 | 2/2003 | Rothkranz et al. |
| 2003/0045345 | A1 | 3/2003 | Berman |
| 2003/0060266 | A1 | 3/2003 | Baerlocher |
| 2003/0064773 | A1 | 4/2003 | Baerlocher et al. |
| 2003/0069068 | A1 | 4/2003 | Kaminkow |
| 2003/0078096 | A1 | 4/2003 | Kaminkow et al. |
| 2003/0092480 | A1 | 5/2003 | White et al. |
| 2003/0114215 | A1 | 6/2003 | Adams et al. |
| 2003/0144053 | A1 | 7/2003 | Michaelson |
| 2003/0153378 | A1 | 8/2003 | Schlegel et al. |
| 2003/0157982 | A1 | 8/2003 | Gerrard et al. |
| 2003/0162578 | A1 | 8/2003 | Baerlocher et al. |
| 2003/0186733 | A1 | 10/2003 | Wolf et al. |
| 2003/0203752 | A1 | 10/2003 | Kaminkow et al. |
| 2003/0216165 | A1 | 11/2003 | Singer et al. |
| 2004/0009803 | A1 | 1/2004 | Bennett et al. |
| 2004/0023714 | A1 | 2/2004 | Asdale |
| 2004/0048644 | A1 | 3/2004 | Gerrard et al. |
| 2004/0048649 | A1 | 3/2004 | Peterson et al. |
| 2004/0048650 | A1 | 3/2004 | Mierau et al. |
| 2004/0048657 | A1 | 3/2004 | Gauselmann |
| 2004/0053665 | A1 | 3/2004 | Baerlocher |
| 2004/0053677 | A1 | 3/2004 | Hughs-Baird |
| 2004/0058727 | A1 | 3/2004 | Marks et al. |
| 2004/0077401 | A1 | 4/2004 | Schlottmann |
| 2004/0077402 | A1 | 4/2004 | Schlottmann |
| 2004/0097280 | A1 | 5/2004 | Gauselmann |
| 2004/0106444 | A1 | 6/2004 | Cuddy et al. |
| 2004/0176156 | A1 | 9/2004 | Walker et al. |
| 2004/0180714 | A1 | 9/2004 | Ward |
| 2004/0192431 | A1 | 9/2004 | Singer et al. |
| 2004/0195773 | A1 | 10/2004 | Masci et al. |
| 2004/0219968 | A1 | 11/2004 | Fiden et al. |
| 2004/0242314 | A1 | 12/2004 | Casey |
| 2004/0242315 | A1 | 12/2004 | Paulsen et al. |
| 2004/0248639 | A1 | 12/2004 | Slomiany |
| 2005/0009597 | A1 * | 1/2005 | Daly ............................... 463/20 |
| 2005/0020351 | A1 | 1/2005 | Baerlocher et al. |
| 2005/0033461 | A1 | 2/2005 | Gerrard et al. |
| 2005/0054404 | A1 | 3/2005 | Baerlocher |
| 2005/0054405 | A1 | 3/2005 | Baerlocher et al. |
| 2005/0054415 | A1 | 3/2005 | Kaminkow et al. |
| 2005/0054416 | A1 | 3/2005 | Hostetler et al. |
| 2005/0054420 | A1 | 3/2005 | Cregan et al. |
| 2005/0054429 | A1 | 3/2005 | Baerlocher et al. |
| 2005/0054435 | A1 | 3/2005 | Rodgers et al. |
| 2005/0054436 | A1 | 3/2005 | Frizzell et al. |
| 2005/0059456 | A1 | 3/2005 | Mead et al. |
| 2005/0059460 | A1 | 3/2005 | Breen et al. |
| 2005/0059461 | A1 | 3/2005 | Ching et al. |
| 2005/0059481 | A1 | 3/2005 | Joshi et al. |
| 2005/0059486 | A1 | 3/2005 | Kaminkow |
| 2005/0060050 | A1 | 3/2005 | Baerlocher et al. |
| 2005/0064928 | A1 | 3/2005 | Baerlocher et al. |
| 2005/0096114 | A1 | 5/2005 | Cannon et al. |
| 2005/0096123 | A1 | 5/2005 | Cregan et al. |
| 2005/0101372 | A1 | 5/2005 | Mierau et al. |
| 2005/0101378 | A1 | 5/2005 | Kaminkow et al. |
| 2005/0124404 | A1 | 6/2005 | Nicely |
| 2005/0124406 | A1 | 6/2005 | Cannon |
| 2005/0130731 | A1 | 6/2005 | Englman et al. |
| 2005/0130737 | A1 | 6/2005 | Englman et al. |
| 2005/0148384 | A1 | 7/2005 | Marks et al. |
| 2005/0170876 | A1 | 8/2005 | Masci et al. |
| 2005/0181860 | A1 | 8/2005 | Nguyen et al. |
| 2005/0192081 | A1 | 9/2005 | Marks et al. |
| 2005/0197180 | A1 | 9/2005 | Kaminkow et al. |
| 2005/0208994 | A1 | 9/2005 | Berman |
| 2005/0218591 | A1 | 10/2005 | Torigian et al. |
| 2005/0255903 | A1 | 11/2005 | Jackson |
| 2006/0025195 | A1 | 2/2006 | Pennington et al. |
| 2006/0030401 | A1 | 2/2006 | Mead et al. |
| 2006/0040723 | A1 | 2/2006 | Baerlocher et al. |
| 2006/0040732 | A1 | 2/2006 | Baerlocher et al. |
| 2006/0040733 | A1 | 2/2006 | Baerlocher et al. |
| 2006/0040734 | A1 | 2/2006 | Baerlocher et al. |
| 2006/0040736 | A1 | 2/2006 | Baerlocher et al. |
| 2006/0046822 | A1 | 3/2006 | Kaminkow et al. |
| 2006/0046830 | A1 | 3/2006 | Webb |
| 2006/0068882 | A1 | 3/2006 | Baerlocher et al. |
| 2006/0068892 | A1 | 3/2006 | Gomez et al. |
| 2006/0068893 | A1 | 3/2006 | Jaffe et al. |
| 2006/0073874 | A1 | 4/2006 | Cregan et al. |
| 2006/0084497 | A1 | 4/2006 | Marks et al. |
| 2006/0084500 | A1 | 4/2006 | Baerlocher et al. |
| 2006/0089191 | A1 | 4/2006 | Singer et al. |
| 2006/0121969 | A1 | 6/2006 | Marks et al. |
| 2006/0148554 | A1 | 7/2006 | Hornik et al. |
| 2006/0183528 | A1 | 8/2006 | Rodgers et al. |
| 2006/0183535 | A1 | 8/2006 | Marks et al. |
| 2006/0199628 | A1 | 9/2006 | Rodgers et al. |
| 2006/0217189 | A1 | 9/2006 | Walker et al. |
| 2006/0246977 | A1 | 11/2006 | Cannon |
| 2006/0252518 | A1 | 11/2006 | Walker et al. |
| 2007/0015566 | A1 | 1/2007 | Baerlocher et al. |
| 2007/0026923 | A1 | 2/2007 | Muir |
| 2007/0032285 | A1 | 2/2007 | Wolf |
| 2007/0054732 | A1 | 3/2007 | Baerlocher |
| 2007/0054733 | A1 | 3/2007 | Baerlocher |
| 2007/0060271 | A1 | 3/2007 | Cregan et al. |
| 2007/0060300 | A1 | 3/2007 | Baerlocher et al. |
| 2007/0077980 | A1 | 4/2007 | Marks et al. |
| 2007/0077990 | A1 | 4/2007 | Cuddy et al. |
| 2007/0082725 | A1 | 4/2007 | Low et al. |
| 2007/0087809 | A1 | 4/2007 | Baerlocher |
| 2007/0105620 | A1 | 5/2007 | Cuddy et al. |
| 2007/0111782 | A1 | 5/2007 | Adams et al. |
| 2007/0111783 | A1 | 5/2007 | Cuddy et al. |
| 2007/0117606 | A1 | 5/2007 | Baerlocher et al. |
| 2007/0129131 | A1 | 6/2007 | Kaminkow et al. |
| 2007/0129134 | A1 | 6/2007 | Barrie |
| 2007/0149269 | A1 | 6/2007 | Benbrahim |
| 2007/0155464 | A1 | 7/2007 | Baerlocher et al. |
| 2007/0155485 | A1 | 7/2007 | Cuddy et al. |
| 2007/0167211 | A1 | 7/2007 | Rodgers et al. |
| 2007/0167217 | A1 | 7/2007 | Kaminkow et al. |
| 2007/0191087 | A1 | 8/2007 | Thomas et al. |
| 2008/0020817 | A1 | 1/2008 | Kaminkow et al. |
| 2008/0020822 | A1 | 1/2008 | Cuddy et al. |
| 2008/0020823 | A1 | 1/2008 | Cuddy et al. |
| 2008/0020824 | A1 | 1/2008 | Cuddy et al. |
| 2008/0020825 | A1 | 1/2008 | Cuddy et al. |
| 2008/0020829 | A1 | 1/2008 | Baerlocher |
| 2008/0020842 | A1 | 1/2008 | Kaminkow et al. |
| 2008/0020847 | A1 | 1/2008 | Kniesteadt et al. |
| 2008/0026808 | A1 | 1/2008 | Yoshizawa |
| 2008/0026813 | A1 | 1/2008 | Cannon |

(56) References Cited

U.S. PATENT DOCUMENTS

| | | | |
|---|---|---|---|
| 2008/0051168 | A1 | 2/2008 | Kaminkow et al. |
| 2008/0058046 | A1 | 3/2008 | Schwartz et al. |
| 2008/0070662 | A1 | 3/2008 | Verardi et al. |
| 2008/0070676 | A1 | 3/2008 | Baerlocher et al. |
| 2008/0070677 | A1 | 3/2008 | Baerlocher et al. |
| 2008/0070678 | A1 | 3/2008 | Baerlocher et al. |
| 2008/0070702 | A1 | 3/2008 | Kaminkow et al. |
| 2008/0081690 | A1 | 4/2008 | Baerlocher et al. |
| 2008/0081691 | A1 | 4/2008 | Baerlocher et al. |
| 2008/0090651 | A1 | 4/2008 | Baerlocher |
| 2008/0102916 | A1 | 5/2008 | Kovacs et al. |
| 2008/0102920 | A1 | 5/2008 | Baerlocher |
| 2008/0108401 | A1 | 5/2008 | Baerlocher et al. |
| 2008/0108429 | A1 | 5/2008 | Davis et al. |
| 2008/0113765 | A1 | 5/2008 | DeWaal |
| 2008/0113768 | A1 | 5/2008 | Baerlocher |
| 2008/0113771 | A1 | 5/2008 | Baerlocher et al. |
| 2008/0139274 | A1 | 6/2008 | Baerlocher |
| 2008/0139290 | A1 | 6/2008 | Kniesteadt et al. |
| 2008/0149292 | A1 | 6/2008 | Scherb |
| 2008/0153564 | A1 | 6/2008 | Baerlocher et al. |
| 2008/0176650 | A1 | 7/2008 | Wolf et al. |
| 2008/0274788 | A1 | 11/2008 | Wilson |
| 2009/0042644 | A1 | 2/2009 | Zielinski |
| 2013/0095905 | A1 | 4/2013 | Aoki et al. |

FOREIGN PATENT DOCUMENTS

| | | |
|---|---|---|
| EP | 0 410 789 | 7/1990 |
| EP | 0 945 837 | 9/1999 |
| EP | 0 984 408 | 3/2000 |
| EP | 1 199 689 | 4/2002 |
| EP | 1 298 607 | 4/2003 |
| EP | 1 531 434 | 5/2004 |
| EP | 1 764 753 | 3/2007 |
| EP | 1 779 908 | 5/2007 |
| EP | 1 785 957 | 5/2007 |
| GB | 2 090 690 | 7/1982 |
| GB | 2 096 376 | 10/1982 |
| GB | 2 097 160 | 10/1982 |
| GB | 2 100 905 | 1/1983 |
| GB | 2 105 891 | 3/1983 |
| GB | 2 113 881 | 8/1983 |
| GB | 2 117 155 | 10/1983 |
| GB | 2 137 392 | 10/1984 |
| GB | 2 161 008 | 1/1986 |
| GB | 2 170 636 | 8/1986 |
| GB | 2 181 589 | 4/1987 |
| GB | 2 183 882 | 6/1987 |
| GB | 2 191 030 | 12/1987 |
| GB | 2 222 712 | 3/1990 |
| GB | 2 225 889 | 6/1990 |
| GB | 2 226 436 | 6/1990 |
| GB | 2 226 907 | 7/1990 |
| GB | 2 242 300 | 9/1991 |
| GB | 2 262 642 | 6/1993 |
| GB | 2 316 214 | 2/1998 |
| GB | 2 328 311 | 2/1999 |
| WO | WO 96/08799 | 3/1996 |
| WO | WO 97/32285 | 5/1997 |
| WO | WO 00/12186 | 3/2000 |
| WO | WO 01/74464 | 10/2001 |
| WO | WO 03/026759 | 4/2003 |
| WO | WO 03/049053 | 6/2003 |
| WO | WO 2005/002697 | 1/2005 |
| WO | WO 2005/015826 | 2/2005 |
| WO | WO 2006/017067 | 2/2006 |
| WO | WO 2007/021724 | 2/2007 |
| WO | WO 2007/052549 | 5/2007 |
| WO | WO 2008/045464 | 2/2008 |
| WO | WO 2008/045398 | 4/2008 |

* cited by examiner

GAMING SYSTEM AND METHOD FOR PROVIDING A SYMBOL MATRIX WITH A MOVEABLE SYMBOL DISPLAY WINDOW

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

One such gaming machine includes a plurality of reels that each include a plurality of symbols. These gaming machines enable a player to place a wager on one or more paylines associated with a plurality of symbol positions. For each of the reels, certain of the symbols on that reel are generated independently from the symbols on each of the other reels to provide a combination of symbols. If a winning combination of symbols is generated and displayed along a wagered-on payline, the gaming machine provides an award for that payline. If a losing combination of symbols is generated and displayed along a wagered-on payline, the gaming machine provides no award for that payline. Certain of such gaming machines are known to nudge or move, either automatically or in response to a player input, one or more of the reels one or more reel stop positions to modify the generated combination of symbols Such nudging may modify: (i) the generated combination of symbols from a losing combination of symbols to a winning combination of symbols, or (ii) the generated combination of symbols from a winning combination of symbols to a losing combination of symbols. Modifying such generated symbols to potentially alter the award provided to the player provides excitement and enjoyment for certain players.

Accordingly, there is a continuing need to provide new and different gaming systems as well as new and different ways to provide awards to players.

SUMMARY

In various embodiments, the present disclosure generally relates to gaming systems and methods which utilize a symbol matrix or symbol field in conjunction with a movable symbol display window to randomly select different subsets of symbols from the symbol matrix and provide different awards to players based on such selected symbol subsets.

More specifically, in various embodiments, the gaming system disclosed herein includes a persistent or ongoing symbol matrix or symbol field. The symbol matrix includes a plurality of symbol display positions, spaces or spots. The gaming system continuously displays one of a plurality of different symbols at each of the symbol display positions of the ongoing symbol matrix. In various embodiments, the gaming system displays different symbols at different points in time at one or more of the symbol display positions of the symbol matrix. In these embodiments, the gaming system periodically modifies the ongoing symbol matrix by changing one or more of the symbols displayed at one or more of the symbol display positions.

In addition to displaying a symbol matrix including a plurality of symbol display positions, the gaming system disclosed herein displays a moveable symbol display window associated with the symbol matrix or field. The symbol display window includes a plurality of symbol display window positions. A quantity of symbol display window positions of the symbol display window is less than a quantity of symbol display positions of the symbol matrix. Such a configuration provides that the gaming system displays a subset of the symbol display positions of the symbol matrix in the symbol display window (and thus the gaming system displays a subset of the displayed symbols of the symbol matrix in the symbol display window). Put differently, the gaming system utilizes the symbol display window to display the currently active symbol display positions of the symbol matrix.

In one embodiment, the gaming system displays: (i) the moveable symbol display window in the foreground, and (ii) the symbol matrix in the background. In one such embodiment, the gaming system displays the symbols in the symbol display positions of the symbol matrix as a first size and further displays the symbols in the symbol display window positions of the symbol display window as a second, greater size (i.e., the gaming system appears to magnify the display of the symbols in the symbol display window). Displaying the symbol display window at different perceived depths and displaying the symbols as different sizes (based on whether or not such symbols are viewed in the symbol display window) provides that certain portions of the symbol matrix are viewable through the symbol display window and certain other portions of the symbol matrix are blocked by (or otherwise not displayed because of) the magnified viewed portions.

In operation of various embodiments, for a play of a game, the gaming system moves or otherwise modifies the location of the symbol display window relative to the symbol matrix. In one such embodiment, the gaming system moves the symbol display window (relative to the symbol matrix) to a randomly determined location of the symbol matrix. In another such embodiment, the gaming system enables a player to input a direction of movement of the symbol display window and the gaming system moves the symbol display window to a location of the symbol matrix based on a randomly determined distance in the player inputted direction. In another such embodiment, the gaming system enables a player to input a distance of movement of the symbol display window and the gaming system moves the symbol display window the player inputted distance to a location of the symbol matrix based on a randomly determined direction. By enabling the player to at least partially affect the movement of the symbol display window, such embodiments employ an element of skill or strategy in playing the game. It should be appreciated that since one or more of the symbols displayed at the symbol display positions of the symbol matrix are known by the player prior to the movement of the symbol display window, the subsequent movement of the symbol display window over such known displayed symbols provides many players with an anticipatory experience not otherwise associated with certain known gaming machines which include a plurality of reels.

Following the movement of the symbol display window, the gaming system displays a plurality of symbols at the symbol display window positions of the symbol display window. The symbols displayed at the symbol display window positions of the symbol display window correspond with the symbols displayed at the symbol display positions of the symbol display window's relative location in the symbol matrix or field. That is, the symbol display window displays a subset of the symbols displayed at the symbol display positions of the symbol matrix wherein which subset of symbols is displayed is based on the location of the symbol display window relative to the symbol matrix.

After displaying the symbols at the symbol display window positions of the symbol display window, the gaming system determines if any of the symbols of the symbol display window positions of the symbol display window are associated with any awards. The gaming system then displays any awards associated with such displayed symbols and completes the play of the game.

In one embodiment, after completing a play of the game, the next play of the game utilizes the same symbol matrix (or when accounting for any modifications to or replacements of any individual symbols at any individual symbol display positions, substantially the same symbol matrix). In this embodiment, while the symbols of the ongoing or persistent symbol matrix remain the same (or substantially the same) from one game play to the next, based on any subsequent movement of the symbol display window, the gaming system displays different symbols at the symbol display window positions of the symbol display window. That is, while a plurality of the symbols of the symbol matrix remain unchanged from game to game, the symbols analyzed for any associated awards change based on or more random determinations (and zero, one or more player inputs). Accordingly, the gaming system disclosed herein provides an increased level of excitement and enjoyment for certain players as such players attempt to explore different portions of the ongoing symbol matrix or field and thus attempt to win different awards.

Additional features and advantages are described in, and will be apparent from, the following Detailed Description and the figures.

DETAILED DESCRIPTION

Symbol Display Window

In various embodiments, the present disclosure generally relates to gaming systems and methods for providing a moving symbol display window game. In such embodiments, the gaming system utilizes a symbol matrix or symbol field in conjunction with a movable symbol display window to randomly select different subsets of symbols from the symbol matrix and provide different awards to players based on such selected symbol subsets.

While the embodiments described below are directed to a primary wagering game, it should be appreciated that the present disclosure may additionally or alternatively be employed in association with a secondary game. Moreover, while the player's credit balance, the player's wager, and any awards are displayed as an amount of monetary credits or currency in certain of the embodiments described below, one or more of such player's credit balance, such player's wager, and any awards provided to such a player may be for non-monetary credits, promotional credits, and/or player tracking points or credits.

Figure 1:
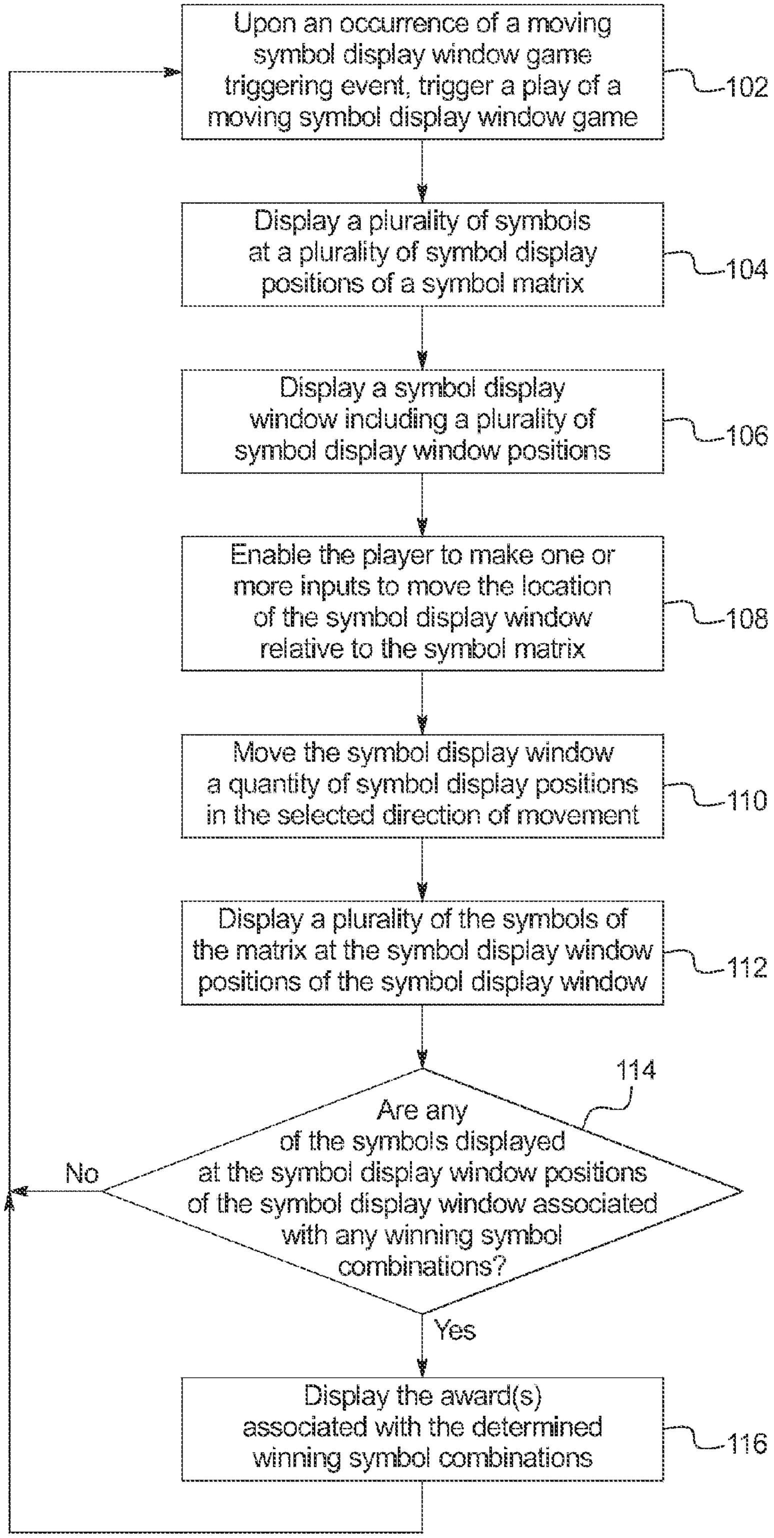
FIG. 1 is a flow chart of an example process for operating a gaming system providing one embodiment of a moving symbol display window game.

Referring now to FIG. 1, a flowchart of an example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 1, it should be appreciated that many other methods of performing the acts associated with this process may be used. For example, the order of certain steps described may be changed, or certain steps described may be optional.

In one embodiment, upon an occurrence of a moving symbol display window game triggering event, as indicated in block 102 of FIG. 1, the gaming system triggers a play of a moving symbol display window game. In one embodiment, the moving symbol display window game disclosed herein is a primary wagering game wherein a moving symbol display window triggering event occurs upon a player placing a wager to play the moving symbol display window game. In another such embodiment, the moving symbol display window game is a secondary or bonus game wherein a moving symbol display window triggering event occurs based on a displayed event associated with a wagered on play of a primary game. In another embodiment wherein the moving symbol display window game is a secondary or bonus game, a moving symbol display window triggering event occurs based on an event independent of any displayed event associated with a wagered on play of a primary game.

As indicated in block 104, for the triggered play of the moving symbol display window game, the gaming system displays a plurality of symbols at a plurality of symbol display positions of a symbol matrix or symbol field. More specifically, the gaming system displays a symbol matrix including a plurality of symbol display positions. Each symbol display position displays or is otherwise associated with one or more symbols. In one embodiment, the symbol matrix includes a grid configuration having a plurality of rows of symbol display positions and a plurality of columns of symbol display positions. In another such embodiment, the symbol matrix includes a non-grid configuration including a plurality of symbol display positions.

Figure 2A:
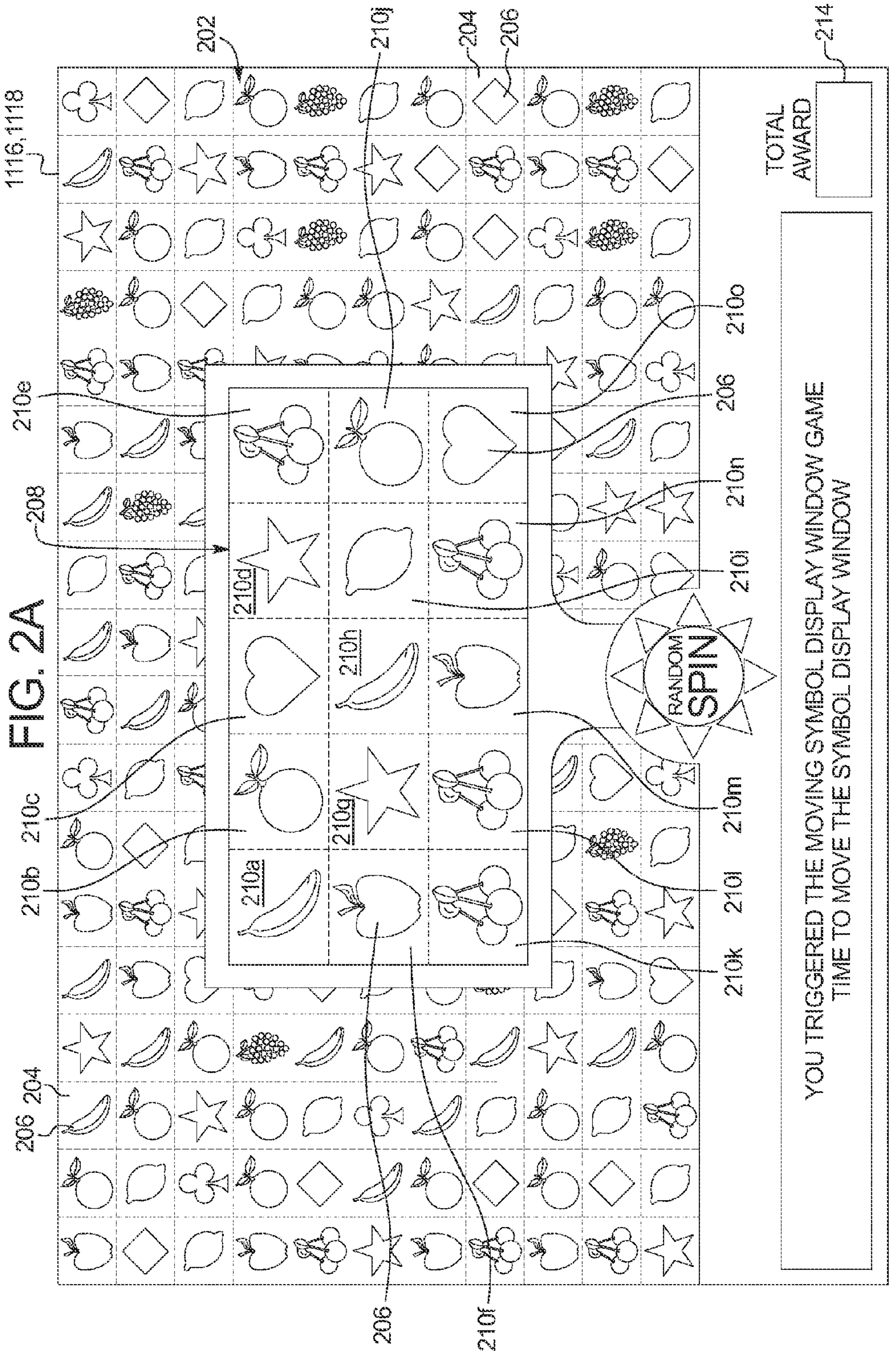
FIGS. 2A, 2B, 2C, 2D, 2E, 2F, 2G and 2H are front views of one embodiment of the gaming system disclosed herein illustrating a plurality of plays of an example moving symbol display window game.

For example, as seen in FIG. 2A, the gaming system displays a symbol field 202 including a plurality of symbol display positions 204. In this example, the gaming system displays one of a plurality of symbols 206 at each of the symbol display positions.

In one embodiment, the symbol matrix is an ongoing or persistent symbol matrix which is displayed over multiple plays of multiple moving symbol display window games. That is, for one or more plays of the moving symbol display window game, the gaming system displays the symbol matrix prior to the play of such games and/or after the plays of such games. Put differently, for a plurality of plays of the moving symbol display window game, the gaming system simultaneously, overlapping or concurrently displays one or more symbols at one or more symbol display positions of the symbol matrix. In one such embodiment, as described below, for zero, one or more of the symbol display positions, the gaming system continuously displays the same symbol(s) at such symbol display positions of the symbol matrix. In another such embodiment, as also described below, for zero, one or more of the symbol display positions, the gaming system displays different symbols, at different points in time, at such symbol display positions of the symbol matrix. In another embodiment, the gaming system generates the symbols of the symbol display positions of the symbol matrix for each play of (or alternatively for each of a plurality of plays of) the moving symbol display window game.

For the play of the triggered moving symbol display window game, the gaming system also displays a symbol display window including a plurality of symbol display window positions as indicated in block 106. The symbol display window is associated with the symbol matrix such that a plurality of the symbols displayed at the symbol display positions of the symbol matrix are displayed at the symbol display window positions of the symbol display window. That is, based on the current location of the symbol display window relative to the symbol matrix, one or more symbol display window positions of the symbol display correspond with one or more symbol display positions of the symbol matrix such that any symbol displayed at a symbol display position of the symbol matrix is displayed at the corresponding symbol display window position of the symbol display window.

Continuing with the above-described example, as seen in FIG. 2A, the gaming system displays a symbol display window 208 including a plurality of symbol display window positions 210. As seen in this example, each of the symbol display window positions 210 corresponds to one of the symbol display positions 204 of the symbol matrix and thus displays one of the symbols of the symbol matrix. In this example, the gaming system provides appropriate messages such as "YOU TRIGGERED THE MOVING SYMBOL DISPLAY WINDOW GAME" and "TIME TO MOVE THE SYMBOL DISPLAY WINDOW" to the player visually, or through suitable audio or audiovisual displays.

In one embodiment, a quantity of symbol display window positions of the symbol display window is less than a quantity of symbol display positions of the symbol matrix. For example, as seen in FIG. 2A, the symbol display window includes fifteen symbol display window positions while the symbol matrix includes more than fifteen symbol display positions. Such a configuration provides that the gaming system displays a subset of the symbol display positions of the symbol matrix in the symbol display window (and thus the gaming system displays a subset of the displayed symbols of the symbol matrix in the symbol display window).

Figure 2B:
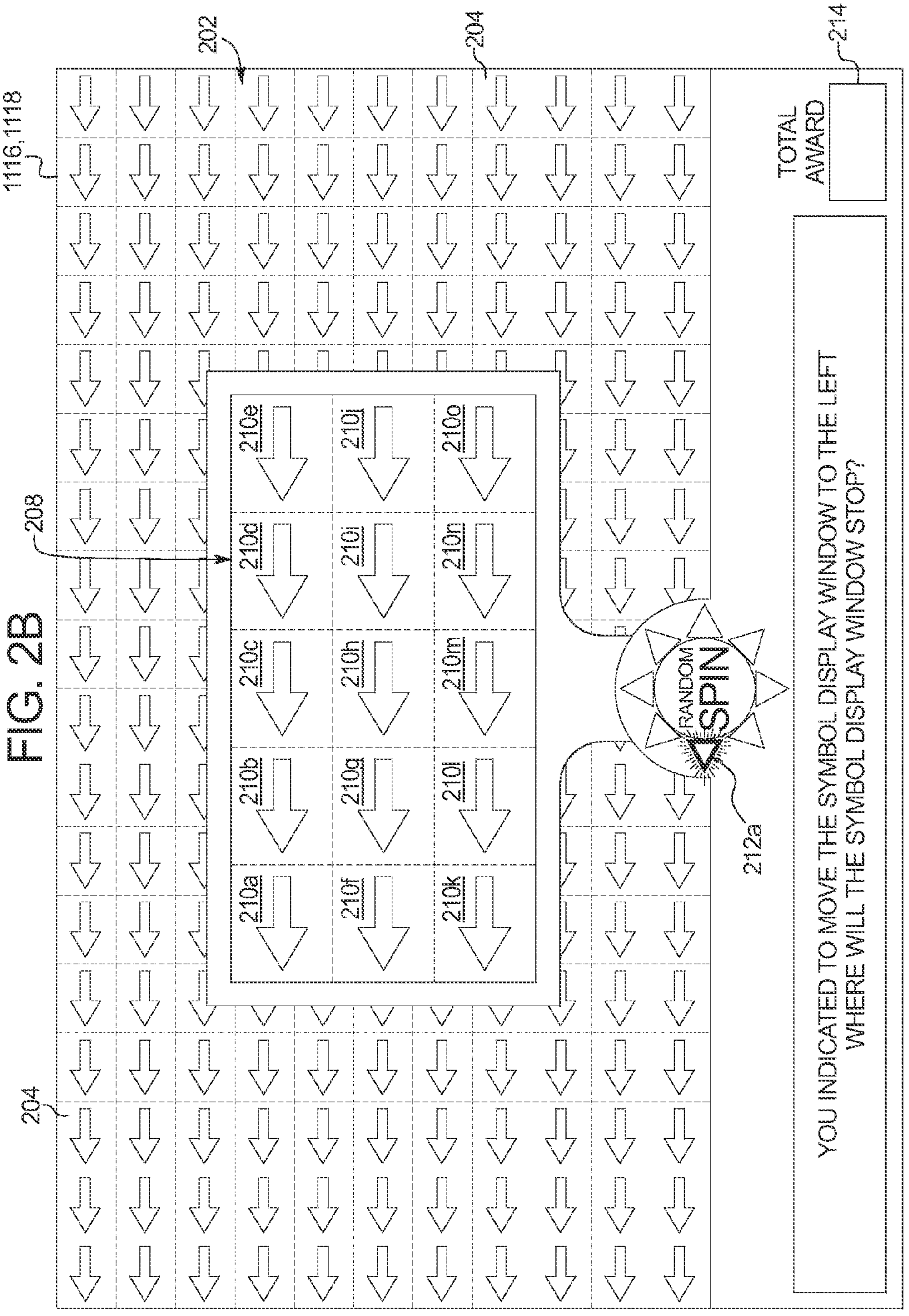

After displaying the symbol display window and the symbol matrix, as indicated in block 108 of FIG. 1, the gaming system enables the player to make one or more inputs to move or otherwise modify the location of the symbol display window relative to the symbol matrix. In one such embodiment, the gaming system enables a player to input a direction of movement of the symbol display window and the gaming system moves the symbol display window to a location of the symbol matrix based on a randomly determined distance in the player inputted direction. For example, as seen in FIG. 2B, the player selected direction of movement 212*a* and the gaming system moves or scrolls the symbol display window in the player indicated direction. In this example, the gaming system provides appropriate messages such as "YOU INDICATED TO MOVE THE SYMBOL DISPLAY WINDOW TO THE LEFT" and "WHERE WILL THE SYMBOL DISPLAY WINDOW STOP?" to the player visually, or through suitable audio or audiovisual displays.

It should be appreciated that in certain embodiments, since the gaming system displays certain symbols at the symbol display positions of the symbol matrix, one or more of the symbols that the player sees in the symbol display positions adjacent to or otherwise near the symbol display window will be part of the next subset of symbols displayed in the symbol display window positions, although player cannot be exactly sure which symbols the gaming system will display in which symbol display window positions. For example, by making inputs to move the symbol display window leftwards, the player is trying to select symbols of the symbol matrix that will become part of the next outcome. In this example, if the gaming system moves the symbol display window a randomly selected distance, the player is not assured of which symbol display window positions, if any, the selected symbols will appear at for the next outcome. Accordingly, the gaming system of these embodiments enables the player to select a volatility for the play of the moving symbol display window game.

Following the player's selection of a direction of movement of the symbol display window, the gaming system subsequently moves the symbol display window a quantity of symbol display positions in the selected direction of movement as indicated in block 110 of FIG. 1. The gaming system then displays a plurality of the symbols of the matrix at the symbol display window positions of the symbol display window as indicated in block 112. As described above, the symbols displayed at the symbol display window positions of the symbol display window correspond with the symbols displayed at the symbol display positions of the symbol display window's relative location in the symbol matrix or field. That is, the symbol display window displays a subset of the symbols displayed at the symbol display positions of the symbol matrix wherein which subset of symbols is displayed is based on the location of the symbol display window relative to the symbol matrix.

Figure 2C:
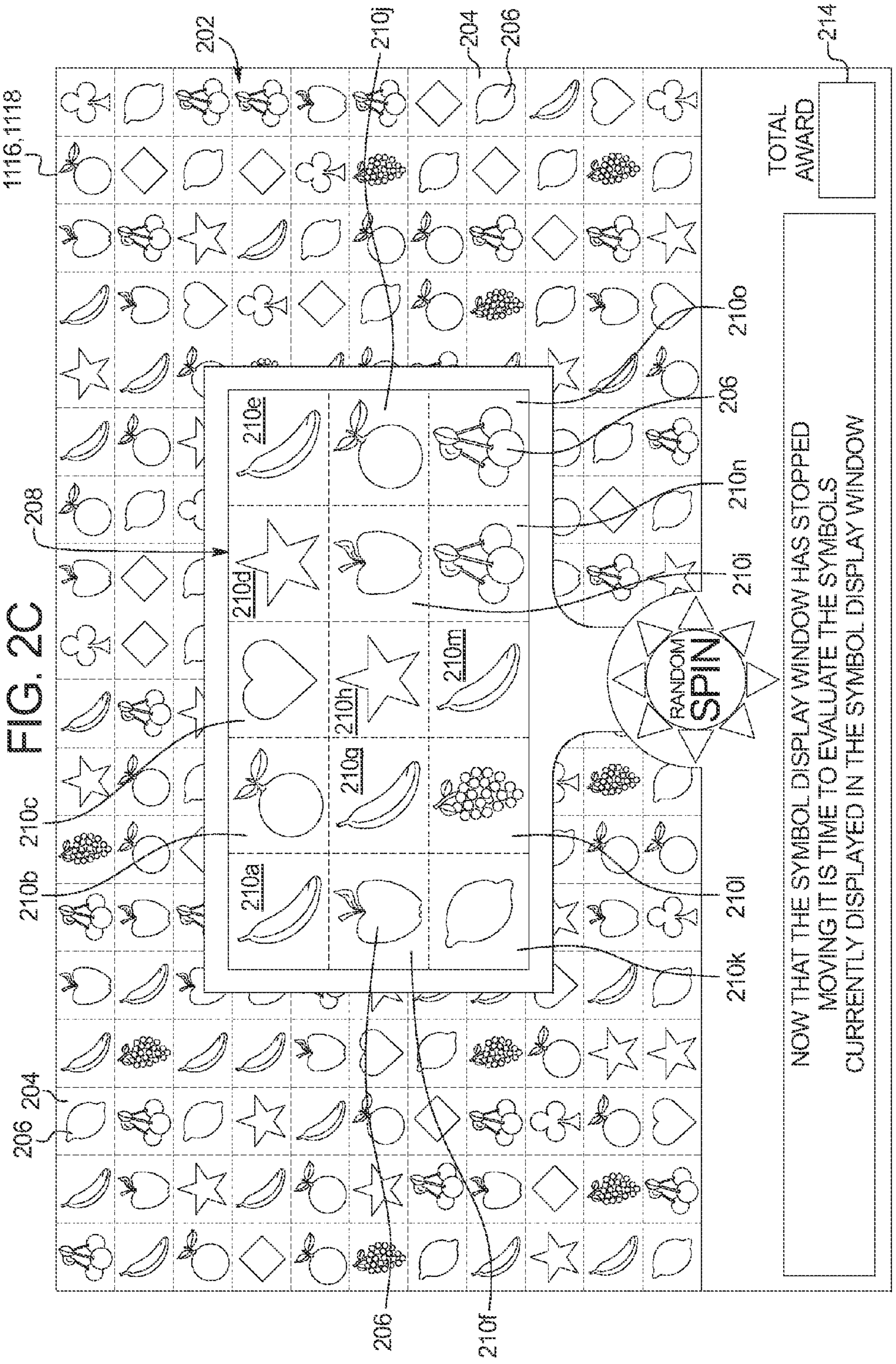

As seen in FIG. 2C, following the movement of the symbol display window, the gaming system displays a plurality of symbols of the symbol matrix at the symbol display window positions of symbol display window. In this example, the symbols 206 displayed at symbol display window positions 210 of symbol display window 208 correspond to symbols 206 displayed at symbol display positions 204 of symbol matrix 202. In this example, the gaming system provides appropriate messages such as "NOW THAT THE SYMBOL DISPLAY WINDOW HAS STOPPED MOVING IT IS TIME TO EVALUATE THE SYMBOLS CURRENTLY DISPLAYED IN THE SYMBOL DISPLAY WINDOW" to the player visually, or through suitable audio or audiovisual displays.

After displaying a subset of the symbols of the symbol matrix in the symbol display window position of the symbol display window, the gaming system determines whether any of the symbols displayed at the symbol display window positions of the symbol display window are associated with any winning symbol combinations as indicated in diamond 114 of FIG. 1. If the symbols displayed at the symbol display window positions of the symbol display window are associated with any winning symbol combinations, the gaming system displays the award(s) associated with the determined winning symbol combinations as indicated in block 116. Following displaying the award(s) associated with the determined winning symbol combinations (or if the symbols displayed at the symbol display window positions of the symbol display window are not associated with any winning symbol combinations), the gaming system returns to block 102 and awaits another occurrence of a moving symbol display window game triggering event.

Figure 2D:
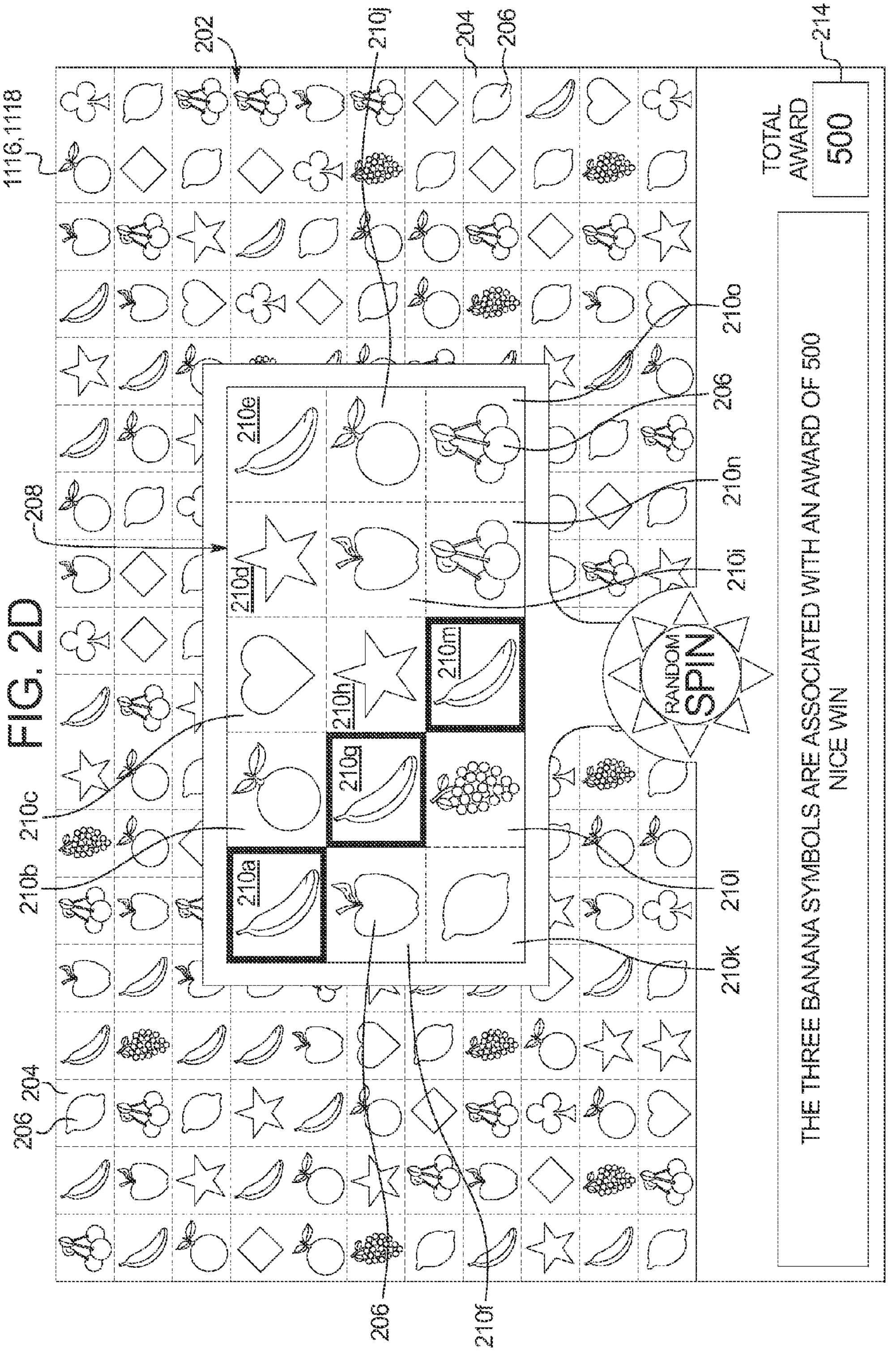

Turning to FIG. 2D, following the movement of the symbol display window, the gaming system determines that the banana symbol-banana symbol-banana symbol combination currently displayed at symbol display window positions 210*a*-210*g*-210*m* of the symbol display window 208 are associated with an award of five-hundred credits. Accordingly, the gaming system displays the award of five-hundred credits to the player (as seen in the total award meter 214) and awaits for another play of the moving symbol display window game. In this example, the gaming system provides appropriate messages such as "THE THREE BANANA SYMBOLS ARE ASSOCIATED WITH AN AWARD OF 500" and "NICE WIN" to the player visually, or through suitable audio OF audiovisual displays.

In one embodiment, after completing a play of the game, the next play of the game utilizes the same symbol matrix (or when accounting for any modifications to or replacements of any individual symbols at any individual symbol display positions, substantially the same symbol matrix). In this embodiment, while the symbols of the ongoing or persistent symbol matrix remain the same (or substantially the same) from one game play to the next, based on any subsequent movement of the symbol display window, the gaming system displays different symbols at the symbol display window positions of the symbol display window. That is, while a plurality of the symbols of the symbol matrix remain unchanged from game to game, the symbols analyzed for any associated awards change based on or more random determinations (and zero, one or more player inputs). Accordingly, the gaming system disclosed herein provides an increased level of excitement and enjoyment for certain players as such players attempt to explore different portions of the ongoing symbol matrix or field and thus attempt to win different awards.

Figure 2E:
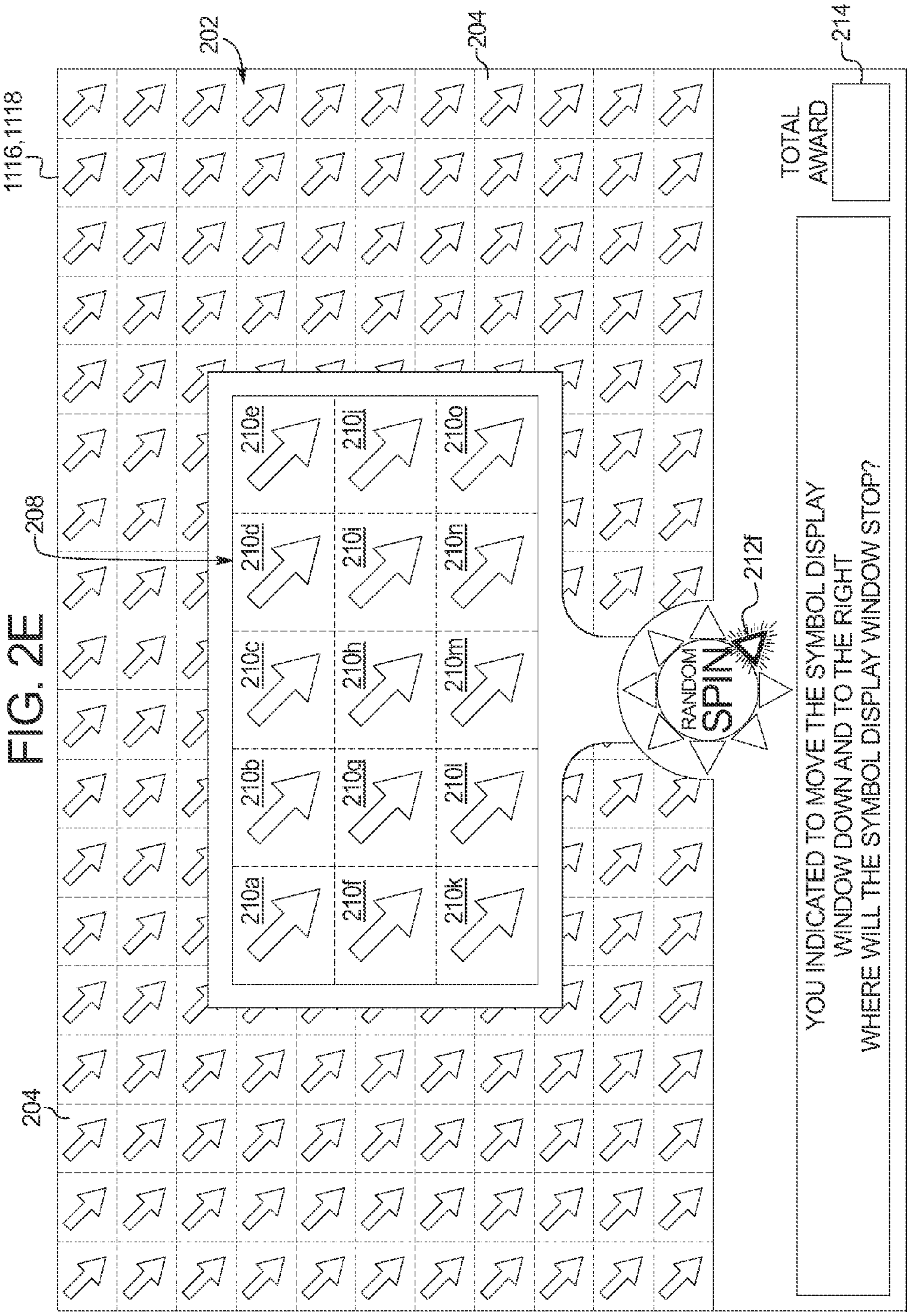

Referring back to the illustrated example, as seen in FIG. 2E, for the next play of the game following the next occurrence of a moving symbol display window game triggering event, the gaming system enables the player to input another direction of movement (i.e., down and to the right 212*f*) to move the symbol display window to another location. In this example, the gaming system provides appropriate messages such as "YOU INDICATED TO MOVE THE SYMBOL DISPLAY WINDOW DOWN AND TO THE RIGHT" and "WHERE WILL THE SYMBOL DISPLAY WINDOW STOP?" to the player visually, or through suitable audio OF audiovisual displays.

Figure 2F:
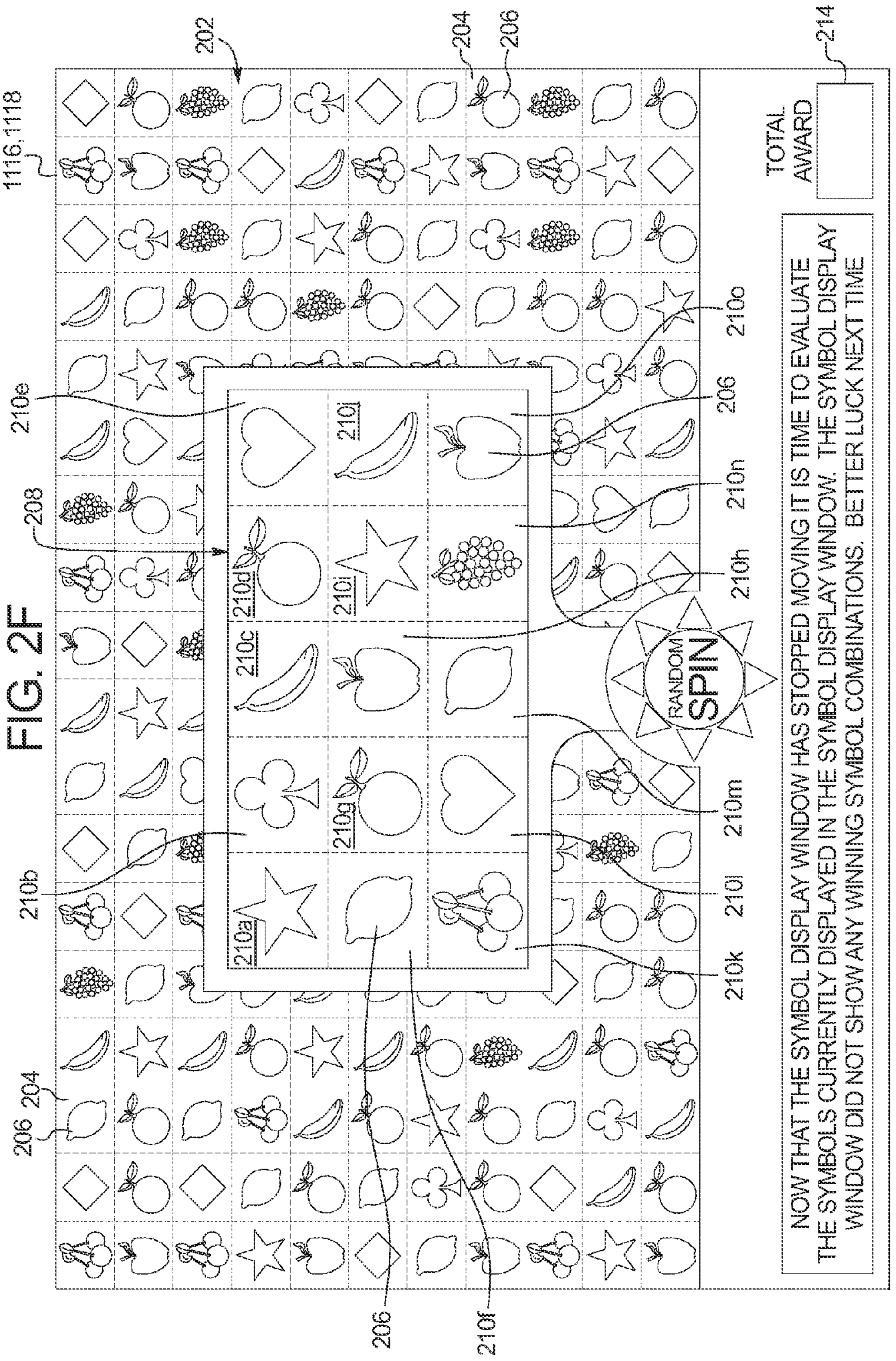

As seen in FIG. 2F, in response to the player's inputted direction of movement (coupled with the gaming system's random determination of a distance to the move the symbol display window), the gaming system moved the symbol display window from the moved-to position from the previous play of the game to another location (relative to the symbol matrix). As also seen in FIG. 2F, the gaming system determined that the symbols of the matrix displayed at the symbol display window positions of the moved symbol display window are not associated with any awards and thus this play of the game ends. In this example, the gaming system provides appropriate messages such as "NOW THAT THE SYMBOL DISPLAY WINDOW HAS STOPPED MOVING IT IS TIME TO EVALUATE THE SYMBOLS CURRENTLY DISPLAYED IN THE SYMBOL DISPLAY WINDOW" and "THE SYMBOL DISPLAY WINDOW DID NOT SHOW ANY WINNING SYMBOL COMBINATIONS. BETTER LUCK NEXT TIME" To the player visually, or through suitable audio or audiovisual displays.

Figure 2G:
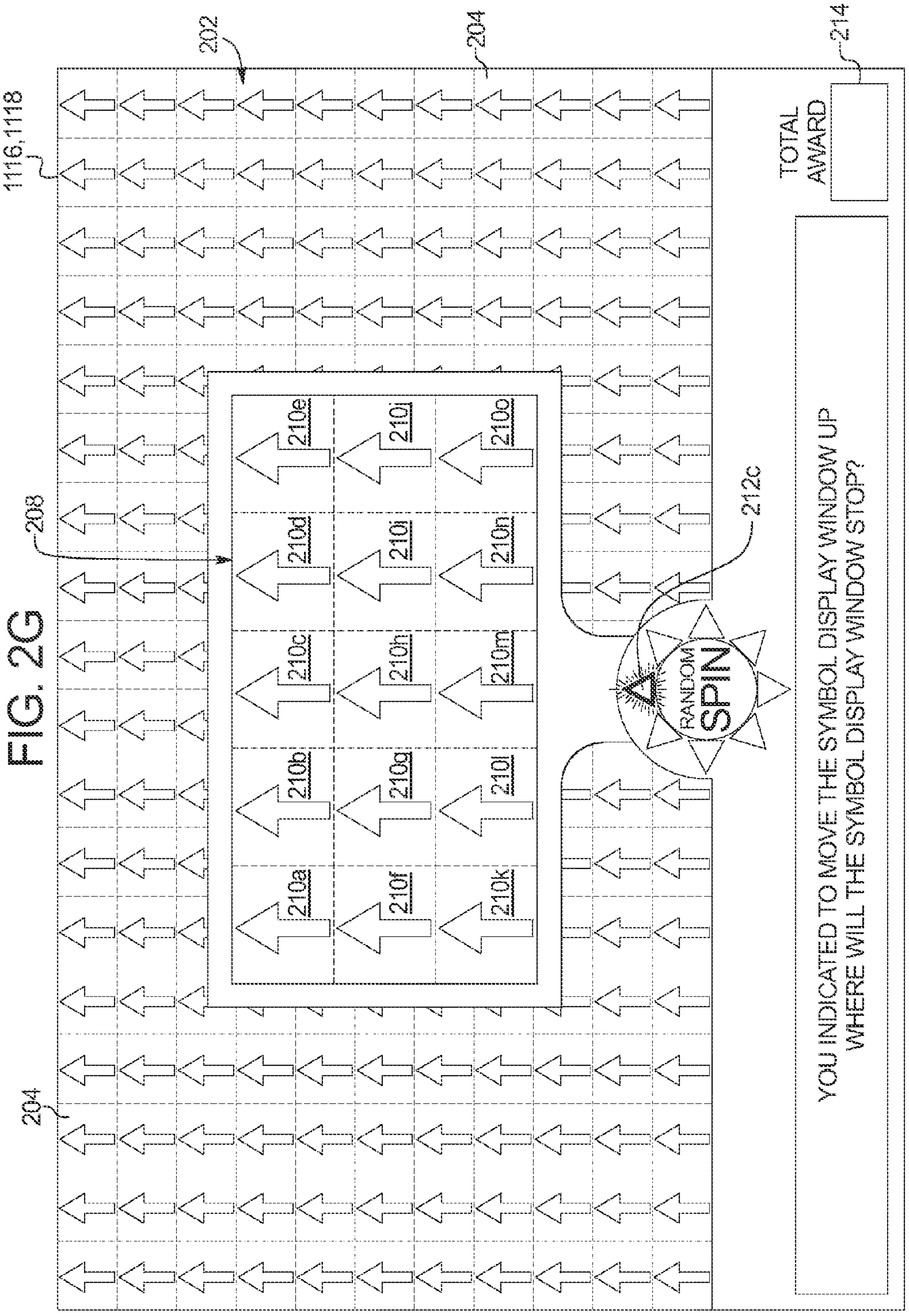

Continuing on with this example, seen in FIG. 2G, for the next play of the game following the next occurrence of a moving symbol display window game triggering event, the gaming system enables the player to input another direction of movement (i.e., up 212*c*) to move the symbol display window to another location. In this example, the gaming system provides appropriate messages such as "YOU INDICATED TO MOVE THE SYMBOL DISPLAY WINDOW UP" and "WHERE WILL THE SYMBOL DISPLAY WINDOW STOP?" to the player visually, or through suitable audio or audiovisual displays.

Figure 2H:
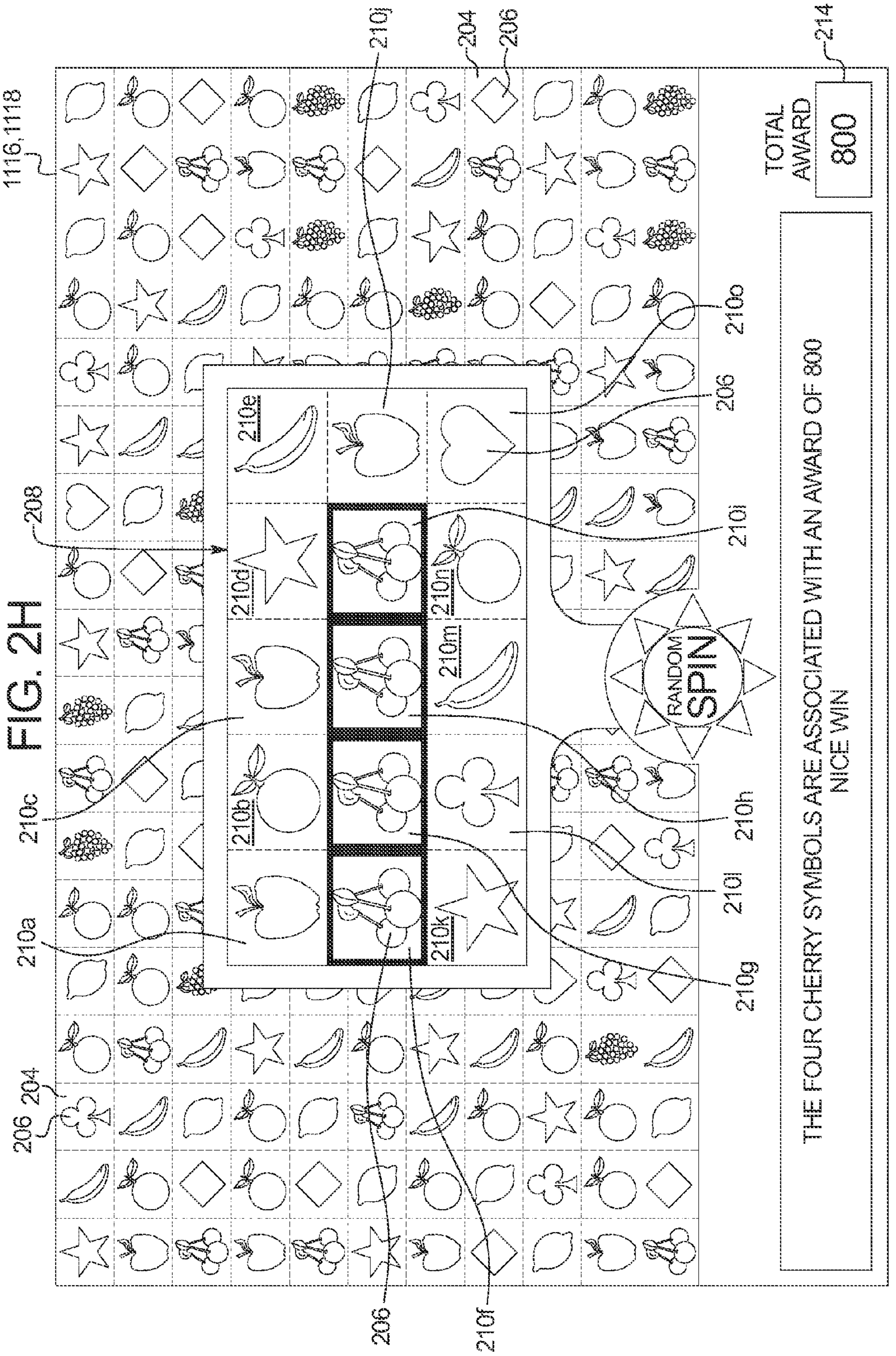

As seen in FIG. 2H, in response to the player's inputted direction of movement (coupled with the gaming system's random determination of a distance to the move the symbol display window), the gaming system moved the symbol display window from the moved-to position from the previous play of the game to another location (relative to the symbol matrix). As also seen in FIG. 2G, following the movement of the symbol display window, the gaming system determines that the cherry symbol-cherry symbol-cherry symbol-cherry symbol combination currently displayed at symbol display window positions 210*f*-210*g*-210*h*-210*i* of the symbol display window 208 are associated with an award of eight-hundred credits. Accordingly, the gaming system displays the award of eight-hundred to the player and awaits for another play of the moving symbol display window game. In this example, the gaming system provides appropriate messages such as "THE FOUR CHERRY SYMBOLS ARE ASSOCIATED WITH AN AWARD OF 800" and "NICE WIN" to the player visually, or through suitable audio or audiovisual displays.

In one embodiment, for each play (or each of a plurality of plays) of the moving symbol display window game, the gaming system generates a plurality of symbols and displays such generated symbols at the symbol display positions of the symbol matrix. In another embodiment, as mentioned above, the symbol matrix includes an ongoing symbol matrix whereon one or more symbols persist or carry-over from one play of the moving symbol display window game to another play of the moving symbol display window game. In one embodiment, each of the symbols of the symbol matrix persist until such symbols are removed from the symbol matrix. In different embodiments, one or more symbols are removed from the symbol matrix based on: (i) such symbols being part of a winning symbol combination, (ii) such symbols being displayed at a symbol display window position of a symbol display window, (iii) such symbols being displayed at a symbol display window position of a symbol display window after a winning symbol combination is generated, (iv) such symbols being temporarily displayed at a symbol display window position of a symbol display window (i.e., the symbol display window removes symbols of the symbol matrix in its path), and (v) such symbols moving off of the portion of the symbol matrix displayed to the player (i.e., the movement of the symbol display window causes the symbols of the displayed portion of the symbol matrix to be no longer displayed to the player wherein when that portion of the symbol matrix is later displayed to the player, that portion of the symbol matrix includes different symbols).

In one such embodiment employing an ongoing symbol matrix, a symbol is removed from the symbol matrix upon that symbol expiring. In this embodiment, one or more of the symbols of the symbol matrix has a finite life span. In one embodiment, the life span of a symbol is measured by the passage of time. In this embodiment, after a predetermined amount of time has passed, the symbol expires and the gaming system replaces that expired symbol with another symbol. In another embodiment, the symbols expire after a predetermined number of plays of the moving symbol display window game. In different embodiments, different symbol display positions of the symbol matrix (and/or different symbols) are associated with different probabilities of changing or modifying the symbol displayed at that symbol display position. In one such embodiment, different areas of symbol display positions of the symbol matrix are associated with different probabilities of changing or modifying the symbols displayed at such symbol display positions. In another embodiment employing an ongoing symbol matrix, as described below, a symbol is removed from the symbol matrix upon that symbol being part of a winning symbol combination.

In another embodiment, as seen in FIGS. 2A to 2H, the gaming system displays one or more of the symbols of the symbol display positions of the symbol matrix which are not also displayed at a corresponding symbol display window position of the symbol display window. In another embodiment, the gaming system partially displays one or more of the symbols of the symbol display positions of the symbol matrix which are not also displayed at a corresponding symbol display window position of the symbol display window. In different examples, the gaming system displays such symbols as if the player were seeing such symbol through rough water, through irregular glass or based on a spatial-time distortion. In another embodiment, the gaming system masks (or otherwise does not display) one or more of the symbols of the symbol display positions of the symbol matrix which are not also displayed at a corresponding symbol display window position of the symbol display window. Such a configuration provides that the structure of the symbol matrix and the symbols at the different symbol display positions are unknown until such symbols come into view of the symbol display window.

In one embodiment, as also seen in FIGS. 2A to 2H, the gaming system displays: (i) the symbol display window in the foreground, and (ii) the symbol matrix in the background. For example, the gaming system displays the symbols in the symbol display positions of the symbol matrix as a first size and further displays the symbols in the symbol display window positions of the symbol display window as a second, greater size (i.e., the gaming system appears to magnify the display of the symbols in the symbol display window). In this example, the gaming system magnifies the symbols of the symbol display window by displaying the symbols of the symbol display positions of the symbol matrix (which are not currently displayed in the symbol display window positions of the symbol display window) and the symbols currently displayed in the symbol display window positions of the symbol display window as different sized symbols. In another embodiment, the gaming system displays the symbols of the symbol display positions of the symbol matrix (which are not currently displayed in the symbol display window positions of the symbol display window) and the symbols currently displayed in the symbol display window positions of the symbol display window as the same sized symbols.

In one embodiment, as described above, upon an occurrence of the moving symbol display window game triggering event, the gaming system provides the player one move of the symbol display window for the play of the triggered moving symbol display game. In another embodiment, upon an occurrence of the moving symbol display window game triggering event, the gaming system provides the player a plurality of moves of the symbol display window for the play of the triggered moving symbol display game.

In one embodiment, the gaming system enables the player to input a direction of movement corresponding to any point of a compass. In another embodiment, the gaming system enables the player to input one of a plurality of predefined directions of movement. In one embodiment, the available directions of movements remain the same for a plurality of (or each) play of the moving symbol display window game. This embodiment enables a player to move the symbol display window back and forth over multiple plays of the game over the same set of symbols of the symbol matrix to try and repeatedly win the same award associated with the same symbol combinations. In another embodiment, to inhibit the above-described backtracking movements, the gaming system varies the available directions of movement for different plays of the moving symbol display window game.

In another embodiment, the gaming system moves the symbol display window (relative to the symbol matrix) to a randomly determined location of the symbol matrix. In another embodiment, the gaming system enables a player to input a distance of movement of the symbol display window and the gaming system moves the symbol display window the player inputted distance to a location of the symbol matrix based on a randomly determined direction. By enabling the player to at least partially affect the movement of the symbol display window, such embodiments employ an element of skill or strategy in playing the game. In another embodiment, the gaming system enables the player to make an input to move the symbol display window to a randomly determined location.

In another embodiment, the gaming system moves the symbol display window along a path or trail over multiple plays of the moving symbol display window game. In another embodiment, the symbol matrix includes a path or trail and the gaming system enables the player to decide whether to move the symbol display window along the path or to move the symbol display window to a different location.

In another embodiment, rather than displaying the symbol display window moving (relative to the symbol matrix), the gaming system displays the symbol display window located at different locations (relative to the symbol matrix). In one such embodiment, the gaming system displays the symbol display window at a first location and then displays the symbol display window at a second, different location (i.e., the gaming system displays the symbol display window popping to different locations relative to the symbol matrix). In one embodiment, the gaming system enables the player to make one or more inputs to stop the symbol display window at a current location.

In one embodiment, as seen in FIGS. 2A to 2H, the gaming system moves the symbol display window relative to the symbol matrix. That is, the gaming system keeps the position or location of the symbol matrix static and moves the location of the symbol display window. In another embodiment, the gaming system moves the symbol matrix relative to the symbol display window. That is, the gaming system keeps the position or location of the symbol display window static and moves the location of the symbol matrix. In another embodiment, the gaming system moves: (i) the symbol matrix relative to the symbol display window, and (ii) the symbol display window relative to the symbol matrix.

In another embodiment, for one or more of the moving symbol display window games disclosed herein, the gaming system employs a plurality of symbol display windows in association with the play of the moving symbol display window game. In one such embodiment, if an additional symbol display window event occurs, the gaming system adds one or more symbol display windows in association with the symbol matrix. In this embodiment, the gaming system provides one or more additional symbol display windows as a bonus for the player.

In another embodiment, for one or more of the moving symbol display window games disclosed herein employing a plurality of symbol display windows, different symbol display windows are associated with different attributes or characteristics. In one such embodiment, the different symbol display windows are associated with different modifiers of any awards associated with the symbols displayed by that symbol display window. In one such embodiment, different symbol display windows move throughout the symbol matrix in different directions. For example, different symbol display windows (which are associated with different modifiers) move in different directions wherein the gaming system provides an award to the first symbol display window to display a symbol of a symbol display position of the symbol matrix (while the gaming system does not provide any awards for any subsequent symbol display windows that display the same symbol at the same symbol display position). In another such embodiment, the different symbol display windows are associated with different abilities to move from symbol display position to symbol display position.

In one embodiment, for one or more of the moving symbol display window games disclosed herein, the quantity of symbol display windows moving to the symbol display positions of the symbol matrix determine one or more aspect of the moving symbol display window game. In one such embodiment, a moving symbol display window game played with one symbol display window is associated with a higher volatility than a moving symbol display window game played with a plurality of symbol display windows.

In another such embodiment employing a plurality of symbol display windows, the plurality of symbol display windows are associated with the same player wherein such symbol display windows each display symbols for the player. In this embodiment, the gaming system evaluates the symbols of the symbol matrix displayed at the symbol display window positions of a plurality of (or each of) the plurality of symbol display windows to determine any awards for the player. For example, each symbol display window includes one symbol display window position wherein the gaming system evaluates the combination of symbols displayed at the symbol display window position for a plurality of the symbol display windows to determine if any of such displayed symbols form any winning symbol combinations.

In another such embodiment employing a plurality of symbol display windows, the plurality of symbol display windows are associated with a plurality of different players. In various embodiments, the gaming system disclosed herein enables a plurality of players to simultaneously, overlapping or concurrently utilize the ongoing symbol matrix. In one such embodiment, the gaming system associates each of the players with an individual symbol display window and further moves each player's individual symbol display window to different locations to display different symbols for award evaluations. In one such embodiment, the plurality of symbol display windows associated with the plurality of players cooperate to display symbols which are evaluated for each of the players. In this embodiment, the gaming system determines an award for each of the players based on the symbols displayed by any of the symbol display windows (i.e., the moving symbol display window game is a cooperative community game). In another such embodiment, if two or more symbol display windows move to the same symbol display position of the symbol matrix at the same time (i.e., two or more symbol display windows overlap), the gaming system applies a modifier to any awards associated with any winning symbol combinations displayed in one or both of the symbol display windows.

In another embodiment, for one or more of the moving symbol display window games disclosed herein, the plurality of symbol display windows associated with the plurality of players compete to display symbols. In this embodiment, the gaming system determines an award for each of the players based on the individual symbols displayed by that player's symbol display window(s) (i.e., the moving symbol display window game is a competitive community game).

In another embodiment, for one or more of the moving symbol display window games disclosed herein, the gaming system generates a symbol at each of the symbol display positions. In another embodiment, the gaming system generates a symbol at a plurality of the symbol display positions. In another embodiment, for one or more of the moving symbol display window games disclosed herein, the gaming system generates a plurality of symbols (at one or more of the symbol display positions. In this embodiment, if a symbol display window displays the symbols of this symbol display position, the gaming system evaluates one, more or each of the plurality of symbols at that symbol display position for any awards.

In one embodiment, the gaming system evaluates the symbols displayed at the symbol display window positions of the symbol display window based on a payline evaluation. In another embodiment, the gaming system evaluates the symbols displayed at the symbol display window positions of the symbol display window based on a ways to win evaluation. In another embodiment, the gaming system evaluates the symbols displayed at the symbol display window positions of the symbol display window based on a scatter pay evaluation. In another embodiment, the gaming system evaluates the symbols displayed at the symbol display window positions of the symbol display window based on a connected lines evaluation.

In another embodiment, the gaming system associates one or more of the symbols of the symbol matrix with one or more different values. In this embodiment, the gaming system determines a total award for the player based on one or more of the values associated with the symbols which are displayed in the symbol display window positions of the symbol display window. In another embodiment, one or more of the symbols of the symbol matrix are playing cards. In this embodiment, the gaming system determines a total award for the player based on if any of the playing cards which are displayed in the symbol display window positions of the symbol display window for any winning playing card hands. In different embodiments, the symbols associated with one or more of the symbol display positions are associated with or otherwise correspond to one or more of: credit amounts, modifiers (e.g., multipliers), physical prizes, free spins, progressive awards, values, virtual goods associated with the gaming system, virtual goods not associated with the gaming system, a play of any suitable slot game, a play of any suitable free spins or free activations game, a play of any suitable wheel game, a play of any suitable card game, a play of any suitable offer and acceptance game, a play of any suitable award ladder game, a play of any suitable puzzle-type game, a play of any suitable persistence game, a play of any suitable selection game, a play of any suitable cascading symbols game, a play of any suitable ways to win game, a play of any suitable scatter pay game, a play of any suitable coin-pusher game, a play of any suitable elimination game, a play of any suitable stacked wilds game, a play of any suitable trail game, a play of any suitable bingo game, a play of any suitable video scratch-off game, a play of any suitable pick-until-complete game, a play of any suitable shooting simulation game, a play of any suitable racing game, a play of any suitable promotional game, a play of any suitable high-low game, a play of any suitable lottery game, a play of any suitable number selection game, a play of any suitable dice game, a play of any suitable skill game, a play of any suitable auction game, a play of any suitable reverse-auction game, a play of any suitable group game or a play of any other suitable type of game.

In another embodiment, the gaming system employs a cascading or tumbling symbols feature to the moving symbol display window game. In this embodiment, the gaming system determines whether any winning symbol combinations are displayed in the symbol display window positions of the symbol display window as described above. If no winning symbol combinations are displayed, the gaming system ends the play of the game and awaits for another moving symbol display window game triggering event. In one embodiment, if the gaming system determines that at least one winning symbol combination is displayed, the gaming system provides an award to the player based on that winning symbol combination and removes any symbols contained in any winning symbol combination displayed by the symbol display window positions of the symbol display window. In another embodiment, if the gaming system determines that at least one winning symbol combination is displayed, the gaming system provides an award to the player based on that winning symbol combination and removes one, more or each of the symbols displayed by the symbol display window positions of the symbol display window. It should be appreciated that since the symbols displayed in the symbol display window positions of the symbol display window are the symbols from the symbol matrix, the removal of any symbols from the symbol display window positions of the symbol display window also represent a removal of any symbols from the symbol display positions of the symbol matrix. It should be further appreciated that, as described above, such removal of any symbols provides another avenue by which the gaming system modifies or changes the symbols of the ongoing symbol matrix.

Following the removal of any symbols, the gaming system fills the resulting empty symbol display positions (i.e., both the symbol display window positions of the symbol display window and the symbol display positions of the symbol matrix) by shifting remaining symbols in a suitable direction, such as downward, to fill the empty symbol positions. Following the shifting, the gaming system generates one of a plurality of symbols to fill each of any then-displayed empty symbol positions. After filling each empty symbol position, the gaming system again determines whether any winning symbol combinations are displayed in the symbol display window positions of the symbol display window. If any winning symbol combinations are displayed, the gaming system provides an award and repeats the symbol shifting, symbol removal and symbol generation process as described above. The gaming system repeats this process until no winning symbol combinations are displayed in the symbol display window positions of the symbol display window.

In another embodiment, for one or more of the moving symbol display window games disclosed herein, the gaming system utilizes a moving bonus triggering symbol which moves from symbol display position to symbol display position of the symbol matrix. In this embodiment, if the symbol display window moves to a current location of the moving bonus triggering symbol, the gaming system triggers a play of one or more bonus games.

In another embodiment, for one or more of the moving symbol display window games disclosed herein, the gaming system associates different bonus games with different areas or portions of the symbol matrix. In this embodiment, the symbol display positions of different areas or portions of the symbol matrix display different bonus game symbols which trigger different bonus games. For example, a first portion of the symbol matrix is associated with a first bonus game wherein the symbol display window is located in this first portion and if a bonus game triggering symbol combination is displayed at the symbol display window positions of the symbol display window, the first bonus game is triggered. In this example, a second, different portion of the symbol matrix is associated with a second, different bonus game wherein the symbol display window is located in this second portion and if a bonus game triggering symbol combination is displayed at the symbol display window positions of the symbol display window, the second bonus game is triggered.

In another embodiment, for one or more of the moving symbol display window games disclosed herein, the gaming system employs a plurality of symbol display position matrices for a play of the moving symbol display window game. In one such embodiment, the gaming system enables the player to pick which of the plurality of symbol display position matrices to employ in association with the play of the moving symbol display window game. In different embodiments, different symbol display position matrices are associated with different volatilities (i.e., different types or ranges of symbols which populate the different symbol display positions of the matrix and/or different probabilities of populating such different symbol display positions of the matrix with such symbols).

In another embodiment, for one or more of the moving symbol display window games disclosed herein, the gaming system employs one or more symbol matrix boundaries or matrix edges which limit where the symbol display window may move to. In another embodiment, for one or more of the moving symbol display window games disclosed herein, the gaming system employs one or more symbol matrix blockers or obstacles which limit where the symbol display window may move to within the symbol matrix. In different embodiments, different symbol display windows have different attributes which enable certain symbol display windows to move past (or move over) such boundaries (and/or such obstacles) while other symbol display windows may not move past (or move over) such boundaries (and/or such obstacles).

In another embodiment, upon an occurrence of a moving symbol display window modification event, the gaming system modifies one or more features of the symbol display window. In one such embodiment, upon an occurrence of a moving symbol display window modification event, the gaming system modifies, such as adds or subtracts, the quantity of symbol display window positions of the symbol display window. In another such embodiment, upon an occurrence of a moving symbol display window modification event, the gaming system modifies the speed which the symbol display window moves. In another such embodiment, upon an occurrence of a moving symbol display window modification event, the gaming system modifies the directions of movement which the symbol display window may move.

In one embodiment, the gaming system modifies any symbol associated one or more of the displayed positions for a designated duration. In one such embodiment, one or more of the displayed positions are associated with modified symbols at different points in time. For example, the gaming system causes one or more symbols of the symbol matrix to be wild symbols for a designated duration. In different embodiments, at certain points in time or in response to one or more events occurring (either in a play of a primary game, a play of the moving symbol display window game or independent of any play of the primary game or any play of the moving symbol display window game), the symbols associated with one or more adjacent symbol display positions temporarily have an increased value or additional symbol features. Such a configuration provides that the award provided to a player in response to a movement of the symbol display window is based not only on the location of the symbol display window but also on if any of the symbols of the moved-to location are currently associated with an increased award or additional symbol features.

In different embodiments, a modification of a symbol lasts until that symbol is displayed at a symbol display window position of the symbol display window (or until that symbol is included in a winning symbol combination). In another embodiment, a modification of a symbol lasts for a designated period of time or a quantity of games played. In one embodiment, different symbol display positions of the symbol matrix are associated with different modifications to any associated symbols at different points in time. In this embodiment, the gaming system temporarily associates one set of symbols of one set of symbol display positions with a first modification, and temporarily associates another set of symbols at another set of symbol display positions with a second modification. In one embodiment, the gaming system indicates to the players which displayed symbols are temporarily associated with increased awards (and which displayed symbols are not associated with increased awards).

In one embodiment, for one or more of the moving symbol display window games disclosed herein, the gaming system causes at least one display device of the player's gaming device to display any of the moving symbol display window games disclosed herein. In another embodiment, in addition or in alternative to each gaming device displaying any of the moving symbol display window games disclosed herein, the gaming system causes one or more community or overhead display devices to display part or all of any of the moving symbol display window games disclosed herein to one or more other players or bystanders either at a gaming establishment or viewing over a network, such as the internet.

In another embodiment, in addition or in alternative to each gaming device displaying any of the moving symbol display window games disclosed herein, the gaming system causes one or more internet sites to each display any of the moving symbol display window games disclosed herein such that a player is enabled to log on from a personal web browser. In another such embodiment, the gaming system enables the player to play one or more primary games on one device while viewing any of the moving symbol display window games disclosed herein from another device. For example, the gaming system enables the player to play one or more primary games on a mobile phone while viewing the status any of the moving symbol display window games disclosed herein on a desktop or laptop computer. In one such embodiment, while in a physical gaming establishment, the symbol display window moves throughout the symbol matrix to display one or more symbol combinations associated with one or more monetary awards. In this embodiment, when the player is subsequently remote from the physical gaming establishment and accesses the game, the symbol display window moves throughout the symbol matrix to display one or more symbol combinations associated with one or more non-monetary awards. Such a configuration increases the level of excitement and enjoyment for certain players as these players experience games which employ the ongoing symbol matrix regardless of the player's specific location.

In another embodiment, as mentioned above, a moving symbol display window game triggering event occurs, based on an outcome associated with one or more plays of any primary game and/or an outcome associated with one or more plays of any secondary game of the gaming devices in the gaming system. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes a moving symbol display window game triggering event to occur.

In another embodiment, as also mentioned above, the gaming system does not provide any apparent reasons to the players for a moving symbol display window game triggering event to occur. In these embodiments, such determinations are not triggered by an event in a primary game or based specifically on any of the plays of any primary game or on any of the plays of any secondary game of the gaming devices in the system. That is, these events occur without any explanation or alternatively with simple explanations.

In one embodiment, a moving symbol display window game triggering event occurs, based on an amount coin-in. In this embodiment, the gaming system determines if an amount of coin-in wagered at one or more gaming devices in the gaming system reaches or exceeds a designated amount of coin-in (i.e., a threshold coin-in amount). Upon the amount of coin-in wagered at one or more gaming devices in the gaming system reaching or exceeding the bonus threshold coin-in amount, the gaming system causes one or more of such events or conditions to occur. In different embodiments, the threshold coin-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, a moving symbol display window game triggering event occurs, based on an amount coin-out. In this embodiment, the gaming system determines if an amount of coin-out provided by one or more gaming devices in the gaming system reaches or exceeds a designated amount of coin-out (i.e., a threshold coin-out amount). Upon the amount of coin-out provided at one or more gaming devices in the gaming system reaching or exceeding the threshold coin-out amount, the gaming system causes one or more of such events or conditions to occur. In different embodiments, the threshold coin-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, a moving symbol display window game triggering event occurs, based on a predefined variable reaching a defined parameter threshold. For example, when the 500,000$^{th}$ player has played a gaming device of the gaming system (ascertained from a player tracking system), one or more of such events or conditions occur. In different embodiments, the predefined parameter thresholds include a length of time, a length of time after a certain dollar amount is hit, a wager level threshold for a specific device (which gaming device is the first to contribute $250,000), a number of gaming devices active, or any other parameter that defines a suitable threshold.

In another alternative embodiment, a moving symbol display window game triggering event occurs, based on a quantity of games played. In this embodiment, a quantity of games played is set for when one or more of such events or conditions will occur. In one embodiment, such a set quantity of games played is based on historic data.

In another alternative embodiment, a moving symbol display window game triggering event occurs, based on time. In this embodiment, a time is set for when one or more of such events or conditions will occur. In one embodiment, such a set time is based on historic data.

In another alternative embodiment, a moving symbol display window game triggering event occurs, based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the gaming device. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In another alternative embodiment, a moving symbol display window game triggering event occurs, based on a system determination, including one or more random selections by the central controller. In one embodiment, as described above, the central controller tracks all active gaming devices and the wagers they placed. In one such embodiment, based on the gaming device's state as well as one or more wager pools associated with the gaming device, the central controller determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In another alternative embodiment, a moving symbol display window game triggering event occurs, based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing a moving symbol display window game triggering event to occur may be implemented in accordance with the gaming system and method disclosed herein.

It should be appreciated that any of the above-described moving symbol display window game triggering events may be combined in one or more different embodiments.

Alternative Embodiments

It should be appreciated that in different embodiments, one or more of:

i. a quantity of symbol display positions in a symbol matrix;
ii. a shape or configuration of the symbol display matrix;
iii. which of a plurality of different symbol display matrices to employ;
iv. a quantity of symbol display windows to employ;
v. a quantity of symbol display window positions in a symbol display window;
vi. a shape or configuration of the symbol display window;
vii. an attribute of one or more symbol display windows;
viii. which symbol display positions display which symbols;
ix. a quantity of symbols to associate with a symbol display position;
x. a direction of movement of the symbol display window;
xi. a distance of movement of the symbol display window;
xii. a speed which to move the symbol display window;
xiii. whether to enable a player to make any inputs to determine a direction of movement of the symbol display window;
xiv. whether to enable a player to make any inputs to change the direction of movement of the symbol display window;
xv. whether to remove or modify one or more symbols of the symbol matrix;
xvi. which symbols to remove or modify from the symbol matrix;
xvii. which symbol display positions to remove or modify the symbols displayed at such symbol display positions;
xviii. a duration each symbol remains in the symbol matrix;
xix. a type of symbol evaluation to employ to evaluate the symbols displayed at the symbol display window positions;
xx. whether to employ a cascading symbols feature;
xxi. a quantity of boundaries to utilize;
xxii. a quantity of blocking symbols to utilize;
xxiii. which symbol display positions are associated with blocking symbols;
xxiv. when a moving symbol display window modification event occurs;
xxv. when an additional symbol display window event occurs;
xxvi. any determination disclosed herein;

is/are predetermined, randomly determined, randomly determined based on one or more weighted percentages, determined based on a generated symbol or symbol combination, determined based on a random determination by the central controller, determined based on a random determination at the gaming system, determined based on at least one play of at least one game, determined based on a player's selection, determined based on one or more side wagers placed, determined based on the player's primary game wager, determined based on time (such as the time of day), determined based on an amount of coin-in accumulated in one or more pools, determined based on a status of the player (i.e., a player tracking status), or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of; (a) one or more central servers, central controllers, or remote hosts; (b) one or more electronic gaming machines ("EGMs"); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 3A:
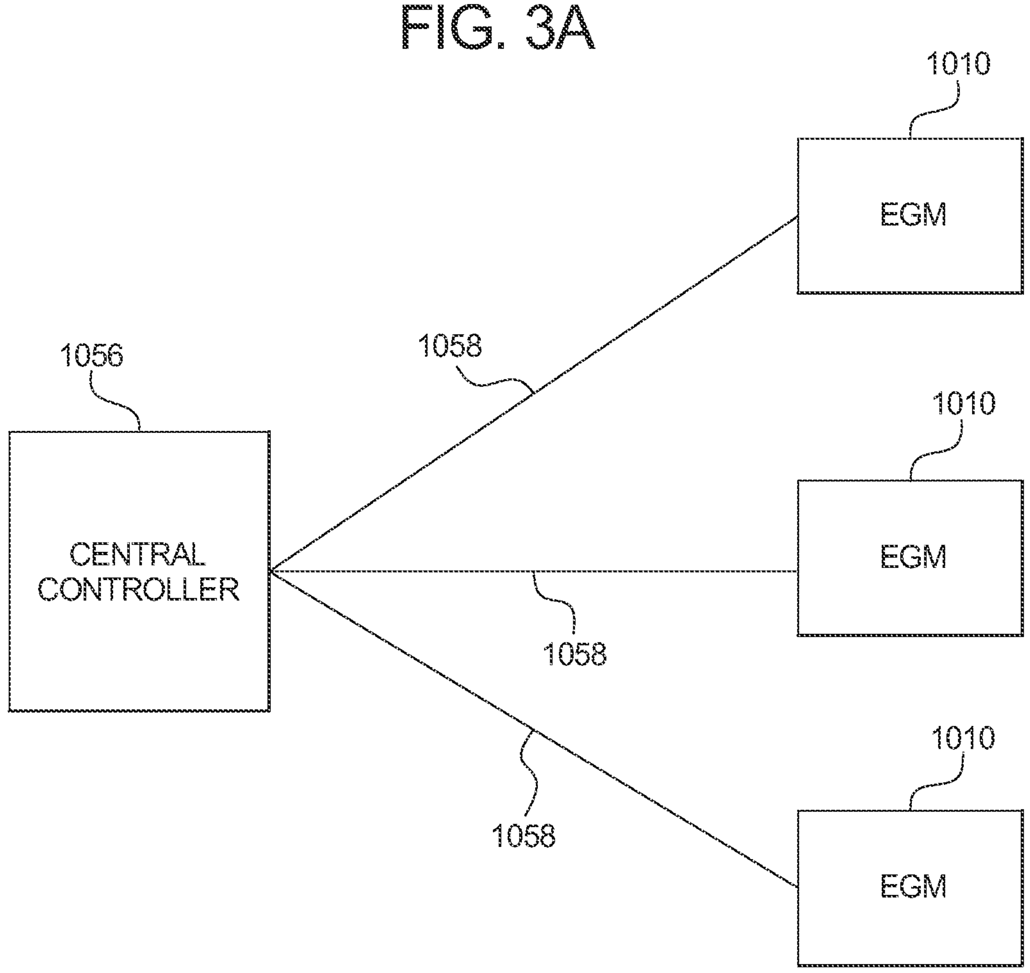
FIG. 3A is a schematic block diagram of one embodiment of a network configuration of the gaming system disclosed herein.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 3A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3B:
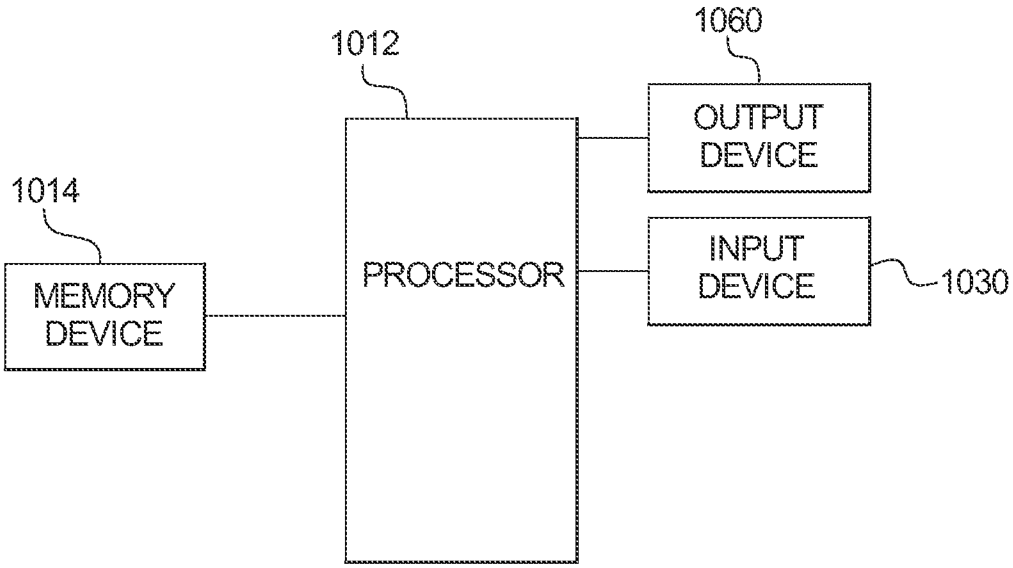
FIG. 3B is a schematic block diagram of one embodiment of an electronic configuration of the gaming system disclosed herein.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 3B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 3B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 4A:
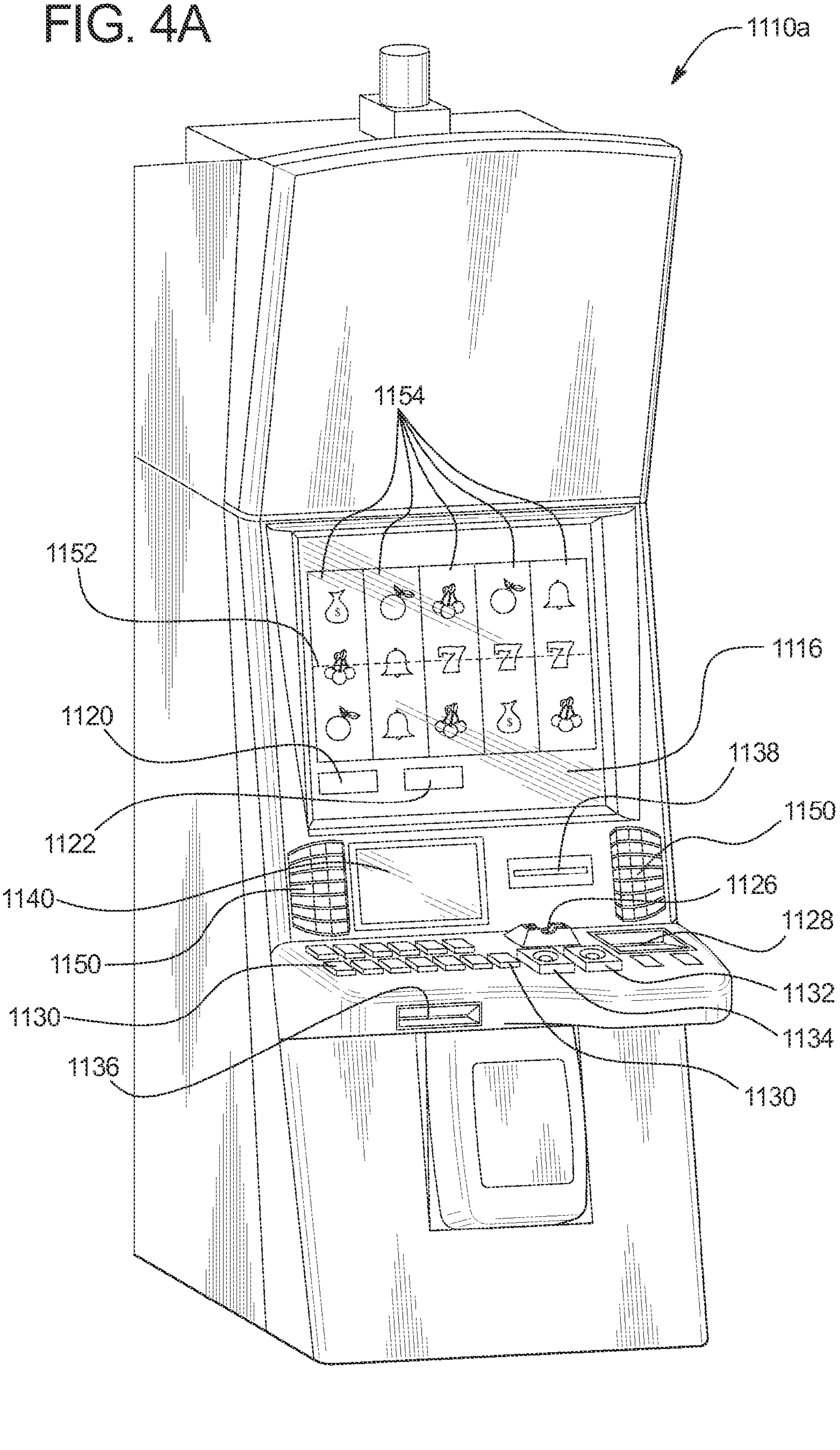
FIGS. 4A and 4B are perspective views of example alternative embodiments of the gaming system disclosed herein.

In various embodiments, the EGM includes one or more input devices. The input devices may include any suitable device that enables an input signal to be produced and received by the at least one processor of the EGM. The example EGM illustrated in FIG. 3B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 4A and 43 illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 4A and 4B each include a game play activation device in the form of a game play initiation button 32. R should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. It should be appreciated that while the player's credit balance, the player's wager, and any awards are displayed as an amount of monetary credits or currency in the embodiments described herein, one or more of such players credit balance, such player's wager, and any awards provided to such player may be for non-monetary credits, promotional credits, and/or player tracking points or credits.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 4A and 4B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 4A and 4B each include a card reader 1138. The card reader is configured to read a player identification card inserted into the card reader.

In various embodiments, the EGM includes one or more output devices. The example EGM illustrated in FIG. 3B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 4A includes a central display device 1116, a player tracking display 1140, a credit display 1120, and a bet display 1122. The example EGM illustrated in FIG. 4B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system: (b) a note generator configured to provide paper currency; (c) a coin generator configured to provide coins or tokens in a coin payout tray; and (d) any suitable combination thereof. The example EGMs illustrated in FIGS. 4A and 4B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 4A and 4B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

Figure 4B:
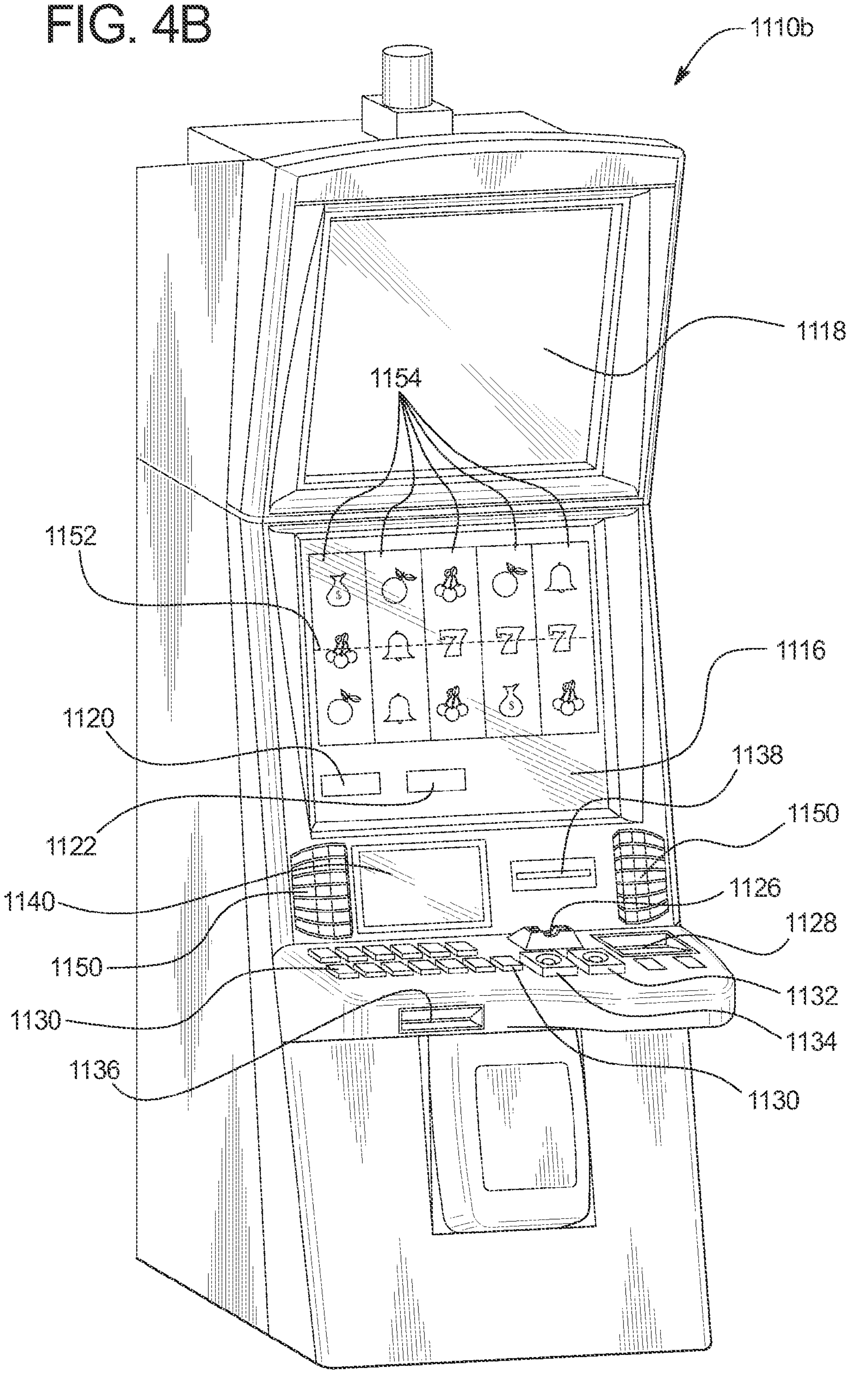

As generally described above, in certain embodiments, such as the example EGMs illustrated in FIGS. 4A and 4B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 4A and 4B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player: and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a rear-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 4A and 4B each include a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased: rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) for a plurality of plays of a game, display:

(i) a persistent symbol matrix including a plurality of persistent symbols at a plurality of symbol display positions, and (ii) a symbol display window associated with the symbol matrix, the symbol display window including a plurality of symbol display window positions, wherein a quantity of the symbol display window positions of the symbol display window is less than a quantity of the symbol display positions of the symbol matrix, and (b) thereafter, for one of the plays of the game:

(i) randomly determine a location of the symbol display window relative to the symbol matrix such that each symbol display window position of the symbol display window corresponds with one of the symbol display positions of the symbol matrix, (ii) for each of a plurality of the symbol display window positions of the symbol display window, display the persistent symbol of the corresponding symbol display position of the symbol matrix, (iii) determine if any of the persistent symbols displayed at the symbol display window positions of the symbol display window form any winning symbol combinations, and (iv) if the persistent symbols displayed at the symbol display window positions of the symbol display window form at least one winning symbol combination, display an award for each formed winning symbol combination.

2. The gaming system of claim 1, wherein when executed by the at least one processor, the plurality of instructions cause the at least one processor to randomly determine the location of the symbol display window based, at least in part, on at least one input.

3. The gaming system of claim 2, wherein the at least one input is selected from the group consisting of: at least one input of a direction of movement of the symbol display window and at least one input of a movement distance of the symbol display window.

4. The gaming system of claim 1, wherein when executed by the at least one processor for another one of the plays of the game, the plurality of instructions cause the at least one processor to:

randomly determine another location of the symbol display window relative to the symbol matrix such that each symbol display window position of the symbol display window corresponds with another one of the symbol display positions of the symbol matrix, for each of the symbol display window positions of the symbol display window, display the persistent symbol of the corresponding symbol display position of the symbol matrix, determine if any of the persistent symbols displayed at the symbol display window positions of the symbol display window form any winning symbol combinations, and if the persistent symbols displayed at the symbol display window positions of the symbol display window form at least one winning symbol combination, display an award for each formed winning symbol combination.

5. The gaming system of claim 1, wherein when executed by the at least one processor if a symbol modification event occurs, the plurality of instructions cause the at least one processor to modify at least one of the persistent symbols displayed at at least one of the symbol display positions of the symbol matrix.

6. The gaming system of claim 5, wherein when executed by the at least one processor, the plurality of instructions cause the at least one processor to cause the symbol modification event to occur based on at least one selected from the group consisting of: a random determination, an elapsed amount of time, at least one of the symbols being included in any winning symbol combination, and at least one of the symbols not being included in any winning symbol combinations.

7. The gaming system of claim 5, wherein when executed by the at least one processor for another play of the game after a symbol modification event occurs, the plurality of instructions cause the at least one processor to:

display: (i) the persistent symbol matrix including a different plurality of persistent symbols at the plurality of symbol display positions, and (ii) the symbol display window, randomly determine another location of the symbol display window relative to the symbol matrix such that each symbol display window position of the symbol display window corresponds with another one of the symbol display positions of the symbol matrix, for each of the symbol display window positions of the symbol display window, display the persistent symbol of the corresponding symbol display position of the symbol matrix, determine if any of the persistent symbols displayed at the symbol display window positions of the symbol display window form any winning symbol combinations, and if the persistent symbols displayed at the symbol display window positions of the symbol display window form at least one winning symbol combination, display an award for each formed winning symbol combination.

8. The gaming system of claim 1, wherein the plurality of symbol display window positions of the symbol display window form at least three columns and at least three rows including a first row, a second row positioned adjacent to the first row and a third row positioned adjacent to the second row and when executed by the at least one processor if the persistent symbols displayed at the symbol display window positions of the symbol display window form at least one winning symbol combination, the plurality of instructions cause the at least one processor to:

(i) remove at least one displayed persistent symbol from at least one displayed winning symbol combination, (ii) for each of any persistent symbols removed from the first row of the symbol display window positions of the symbol display window, reposition at least one of the displayed persistent symbols to another one of the symbol display window positions of the symbol display window to create at least one empty symbol display window position, (iii) for each of any persistent symbols removed from the second row of the symbol display window positions of the symbol display window, reposition at least one of the displayed persistent symbols to another one of the symbol display window positions of the symbol display window to create at least one empty symbol display position, and (iv) for each created empty symbol display window position, display another one of the plurality of symbols.

9. The gaming system of claim 8, wherein the other one of the plurality of symbols displayed is selected from the group consisting of: a randomly generated symbol and one of the plurality of symbols displayed at one of the plurality of symbol display positions of the symbol matrix which does not correspond with any of the symbol display window positions of the symbol display window.

10. The gaming system of claim 1, wherein when executed by the at least one processor, the plurality of instructions cause the at least one processor to display the persistent symbol of the corresponding symbol display position of the symbol matrix for each of the symbol display window positions of the symbol display window.

11. A method of operating a gaming system, the method comprising:

(a) for a plurality of plays of a game, causing at least one display device to display:

(i) a persistent symbol matrix including a plurality of persistent symbols at a plurality of symbol display positions, and (ii) a symbol display window associated with the symbol matrix, the symbol display window including a plurality of symbol display window positions, wherein a quantity of the symbol display window positions of the symbol display window is less than a quantity of the symbol display positions of the symbol matrix, and (b) thereafter, for one of the plays of the game:

(i) causing at least one processor to execute a plurality of instructions to randomly determine a location of the symbol display window relative to the symbol matrix such that each symbol display window position of the symbol display window corresponds with one of the symbol display positions of the symbol matrix, (ii) for each of a plurality of the symbol display window positions of the symbol display window, causing the at least one display device to display the persistent symbol of the corresponding symbol display position of the symbol matrix, (iii) causing the at least one processor to execute the plurality of instructions to determine if any of the persistent symbols displayed at the symbol display window positions of the symbol display window form any winning symbol combinations, and (iv) if the persistent symbols displayed at the symbol display window positions of the symbol display window form at least one winning symbol combination, causing the at least one display device to display an award for each formed winning symbol combination.

12. The method of claim 11, which includes causing the at least one processor to execute the plurality of instructions to randomly determine the location of the symbol display window based, at least in part, on at least one input.

13. The method of claim 12, wherein the at least one input is selected from the group consisting of: at least one input of a direction of movement of the symbol display window and at least one input of a movement distance of the symbol display window.

14. The method of claim 11, which includes, another one of the plays of the game:

causing the at least one processor to execute the plurality of instructions to randomly determine another location of the symbol display window relative to the symbol matrix such that each symbol display window position of the symbol display window corresponds with another one of the symbol display positions of the symbol matrix, for each of the symbol display window positions of the symbol display window, causing the at least one display device to display the persistent symbol of the corresponding symbol display position of the symbol matrix, causing the at least one processor to execute the plurality of instructions to determine if any of the persistent symbols displayed at the symbol display window positions of the symbol display window form any winning symbol combinations, and if the persistent symbols displayed at the symbol display window positions of the symbol display window form at least one winning symbol combination, causing the at least one display device to display an award for each formed winning symbol combination.

15. The method of claim 11, which includes, if a symbol modification event occurs, causing the at least one processor to execute the plurality of instructions to modify at least one of the persistent symbols displayed at at least one of the symbol display positions of the symbol matrix.

16. The method of claim 15, which includes causing the at least one processor to execute the plurality of instructions to cause the symbol modification event to occur based on at least one selected from the group consisting of: a random determination, an elapsed amount of time, at least one of the symbols being included in any winning symbol combination, and at least one of the symbols not being included in any winning symbol combinations.

17. The method of claim 15, which includes, for another play of the game after a symbol modification event occurs:

causing the at least one display device to display: (i) the persistent symbol matrix including a different plurality of persistent symbols at the plurality of symbol display positions, and (ii) the symbol display window, causing the at least one processor to execute the plurality of instructions to randomly determine another location of the symbol display window relative to the symbol matrix such that each symbol display window position of the symbol display window corresponds with another one of the symbol display positions of the symbol matrix, for each of the symbol display window positions of the symbol display window, causing the at least one display device to display the persistent symbol of the corresponding symbol display position of the symbol matrix, causing the at least one processor to execute the plurality of instructions to determine if any of the persistent symbols displayed at the symbol display window positions of the symbol display window form any winning symbol combinations, and if the persistent symbols displayed at the symbol display window positions of the symbol display window form at least one winning symbol combination, causing the at least one display device to display an award for each formed winning symbol combination.

18. The method of claim 11, wherein the plurality of symbol display window positions of the symbol display window form at least three columns and at least three rows including a first row, a second row positioned adjacent to the first row and a third row positioned adjacent to the second row and which includes, if the symbols displayed at the symbol display window positions of the symbol display window form at least one winning symbol combination:

(i) causing the at least one processor to execute the plurality of instructions to remove at least one displayed persistent symbol from at least one displayed winning symbol combination, (ii) for each of any persistent symbols removed from the first row of the symbol display window positions of the symbol display window, causing the at least one processor to execute the plurality of instructions to reposition at least one of the displayed persistent symbols to another one of the symbol display window positions of the symbol display window to create at least one empty symbol display window position, (iii) for each of any persistent symbols removed from the second row of the symbol display window positions of the symbol display window, causing the at least one processor to execute the plurality of instructions to reposition at least one of the displayed persistent symbols to another one of the symbol display window positions of the symbol display window to create at least one empty symbol display position, and (iv) for each created empty symbol display window position, causing the at least one display device to display another one of the plurality of symbols.

19. The method of claim 18, wherein the other one of the plurality of symbols displayed is selected from the group consisting of: a randomly generated symbol and one of the plurality of symbols displayed at one of the plurality of symbol display positions of the symbol matrix which does not correspond with any of the symbol display window positions of the symbol display window.

20. The method of claim 11, which includes causing the at least one display device to display the persistent symbol of the corresponding symbol display position of the symbol matrix for each of the symbol display window positions of the symbol display window.

21. The method of claim 11, which is provided through a data network.

22. The method of claim 21, wherein the data network is an internet.

* * * * *